US011385700B2

(12) United States Patent
Suzuki et al.

(10) Patent No.: US 11,385,700 B2
(45) Date of Patent: Jul. 12, 2022

(54) ESTIMATION OF POWER CONSUMPTION FOR A JOB BASED ON ADJUSTED CALCULATION OF SIMILARITIES BETWEEN JOBS

(71) Applicant: FUJITSU LIMITED, Kawasaki (JP)

(72) Inventors: Shigeto Suzuki, Kawasaki (JP); Michiko Shiraga, Kawasaki (JP); Hiroshi Endo, Atsugi (JP); Takashi Shiraishi, Atsugi (JP); Yoshiyasu Doi, Yokohama (JP); Hiroyuki Fukuda, Yokohama (JP); Takuji Yamamoto, Hachiouji (JP)

(73) Assignee: Fujitsu Limited, Kawasaki (JP)

( * ) Notice: Subject to any disclaimer, the term of this patent is extended or adjusted under 35 U.S.C. 154(b) by 16 days.

(21) Appl. No.: 16/748,476

(22) Filed: Jan. 21, 2020

(65) Prior Publication Data

US 2020/0257350 A1 Aug. 13, 2020

(30) Foreign Application Priority Data

Feb. 7, 2019 (JP) .............................. JP2019-020579

(51) Int. Cl.
  *G06F 1/3228* (2019.01)
  *G06F 7/02* (2006.01)
  *G06F 1/329* (2019.01)

(52) U.S. Cl.
  CPC ............ *G06F 1/3228* (2013.01); *G06F 1/329* (2013.01); *G06F 7/02* (2013.01)

(58) Field of Classification Search
  CPC ............................... G06F 1/329; G06F 1/3203

(Continued)

(56) References Cited

U.S. PATENT DOCUMENTS

| 5,966,143 A * | 10/1999 | Breternitz, Jr. ......... G06F 8/443 345/530 |
| 2001/0020940 A1* | 9/2001 | Nakazato .............. G06F 1/3268 345/418 |

(Continued)

FOREIGN PATENT DOCUMENTS

| WO | 2010/150464 A1 | 12/2010 |
| WO | 2014/175041 A1 | 10/2014 |

OTHER PUBLICATIONS

Rus V., Niraula N., and Banjade R. "Similarity Measure Based on Latent Dirichlet Allocation," 2013, Dept. of Computer Science, The University of Memphis. Accessed online: http://www.cs.memphis.edu/~vrus/publications/2013/CICLing-2013.RusNiraulaBanjade.pdf (Year: 2013).*

(Continued)

*Primary Examiner* — Paul Yen
(74) *Attorney, Agent, or Firm* — Fujitsu Patent Center

(57) ABSTRACT

An apparatus calculates, based on attribute information of a new job and jobs that have been executed, a first similarity level of the attribute information between the new job and the jobs by using a calculation expression, identifies a job whose attribute information is most similar to that of the new job as a first candidate job, and estimates power consumption to be consumed by the new job at power consumption of the first candidate job. The apparatus calculates, for at least one of the jobs, a second similarity level of power consumption between the at least one of the jobs and the new job, identifies a job whose power consumption is most similar to that of the new job as a second candidate job, and adjusts the calculation expression to increase the first similarity level to be calculated between the new job and the second candidate job.

17 Claims, 18 Drawing Sheets

(58) Field of Classification Search
USPC .................................................. 713/300–340
See application file for complete search history.

(56) References Cited

U.S. PATENT DOCUMENTS

| | | |
|---|---|---|
| 2012/0096029 A1 | 4/2012 | Tamura et al. |
| 2015/0074431 A1* | 3/2015 | Nguyen ................ H02J 3/0073 713/300 |
| 2016/0048413 A1* | 2/2016 | Matsuyama ............ G06F 9/505 718/104 |
| 2020/0219627 A1* | 7/2020 | Consoli ................ G06F 16/285 |

OTHER PUBLICATIONS

Borghesi, Andrea Borghesi et al., "Scheduling-based power capping in high performance computing systems", Sustainable Computing: Informatics and Systems, vol. 19, pp. 1-13, Sep. 2018.

* cited by examiner

TOPIC DISTRIBUTION OF JOB ID 1→ [(9, 0.16651897), (14, 0.7462083)],
TOPIC DISTRIBUTION OF JOB ID 2→ [(14, 0.45713046), (21, 0.29362905), (39, 0.16378592)],
⋮ [(12, 0.2744861), (14, 0.45640594), (47, 0.18365338)],
[(5, 0.17968968), (14, 0.46033904), (49, 0.27451676)],
[(14, 0.6382299), (47, 0.27449736)],

COSINE SIMILARITY

FIG. 6

```
                                                                    ─ 91
┌──────────────────────────────────────────────────────────────────────┐
│ JI=JI   jobid=6960998   bulk_id=0    step_id=0     job_name=job_micro.sh │
│ job_type=1    job_model=1    subjobnum=1    user_id=k03944           │
│ group_id=hp170308     pjsub_host=fe01p04    pjsub_rscunit=common     │
│ pjsub_rscgrp=micro    pri=60   pjsub_date_h_epoch=1509704436         │
│ node_disk_use=0  req_x=128    req_y=0 req_z=0 req_node_num=128       │
│ req_core_num=1024                                                     │
└──────────────────────────────────────────────────────────────────────┘
```

 SIMILAR

```
                                                                    ─ 92
┌──────────────────────────────────────────────────────────────────────┐
│ JI=JI   jobid=6958268   bulk_id=0    step_id=0     job_name=job_micro.sh │
│ job_type=1    job_model=1    subjobnum=1    user_id=k03944           │
│ group_id=hp170308     pjsub_host=fe01p07    pjsub_rscunit=common     │
│ pjsub_rscgrp=micro    pri=60   pjsub_date_h_epoch=1509473290         │
│ node_disk_use=0  req_x=1024   req_y=0 req_z=0 req_node_num=1024      │
│ req_core_num=8192                                                     │
└──────────────────────────────────────────────────────────────────────┘
```

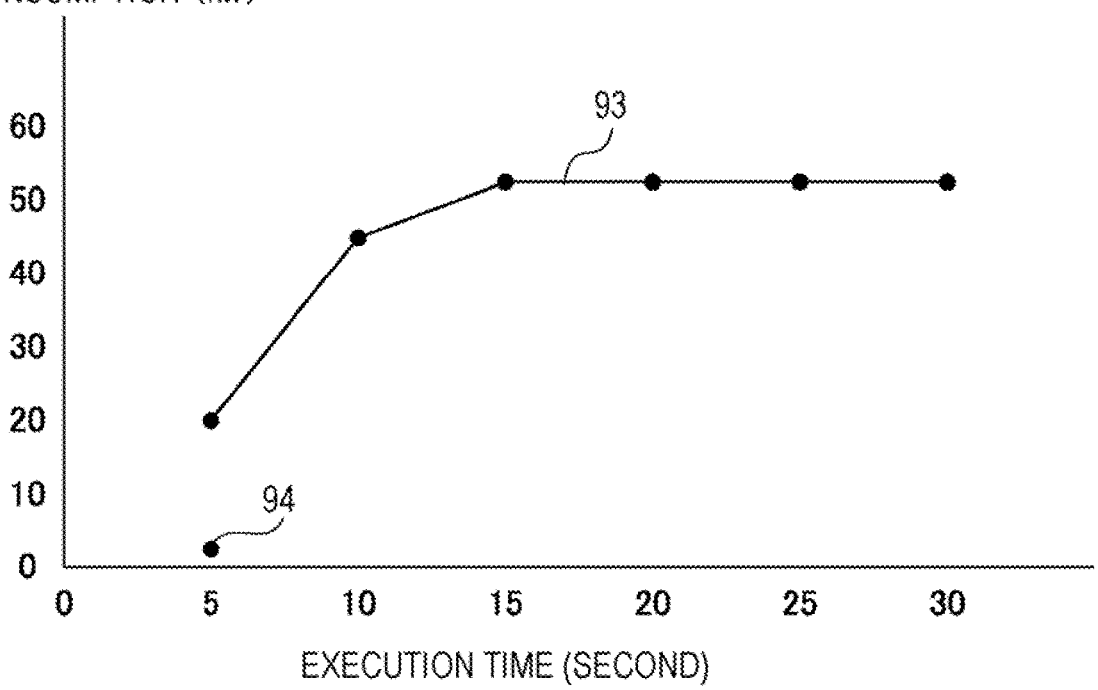

| TOPIC NUMBER | WORD GROUP | | |
|---|---|---|---|
| 1001 | WORD 1001-1 | WORD 1001-2 | ... |
| 1002 | WORD 1002-1 | WORD 1002-2 | ... |
| ... | ... | ... | ... |

113b

| TOPIC NUMBER | WORD GROUP | | |
|---|---|---|---|
| 2001 | WORD 2001-1 | WORD 2001-2 | ... |
| 2002 | WORD 2002-1 | WORD 2002-2 | ... |
| ... | ... | ... | ... | ns of the elements and combinations particularly pointed out in the claims.

ESTIMATION OF POWER CONSUMPTION FOR A JOB BASED ON ADJUSTED CALCULATION OF SIMILARITIES BETWEEN JOBS

CROSS-REFERENCE TO RELATED APPLICATION

This application is based upon and claims the benefit of priority of the prior Japanese Patent Application No. 2019-20579, filed on Feb. 7, 2019, the entire contents of which are incorporated herein by reference.

FIELD

The embodiments discussed herein are related to estimation of power consumption for a job based on adjusted calculation of similarities between jobs.

BACKGROUND

Large-scale computing systems such as high-performance computing (HPC) systems (hereinafter simply referred to as the system) consume a large amount of electric power. Thus, in order to stably operate the system, appropriate management of power consumption of the system is important. For example, when power consumption of the system is able to be maintained at a fixed level, the load on the power supply equipment is reduced.

For the purpose of managing power consumption of the system, it is desirable to previously estimate power demands of the system. As a method for estimating power for an entire system, a conceivable method is to identify a similar job in accordance with the past job submission information containing job names and estimate the power consumption of a submitted job by using the value of power consumption of the identified job as an estimated value.

As a technology usable for estimating power consumption of a job, for example, an information analysis apparatus has been developed in which a statistical model for estimating the frequencies of occurrence of words relating to a particular topic by using two kinds of text describing a single phenomenon is generated.

Another developed information processing apparatus automatically controls devices without constraining the usability by reflecting user's preferences. This information processing apparatus estimates, in accordance with an actual value of power consumption of each device during the first period, power consumption of each device during the subsequent second period. The information processing apparatus compares a statistic value of power consumption of each device during the second period with a target value that is preset, and accordingly changes the condition of each device to nudge the target value.

A still another developed technology performs job scheduling to satisfy the power capping constraints of HPC systems.

Examples of the related art include International Publication Pamphlet Nos. WO 2010/150464 and 2014/175041.

Examples of the related art further include Andrea Borghesi, et al., "Scheduling-based power capping in high performance computing systems", Sustainable Computing: Informatics and Systems, Volume 19, September 2018, Pages 1-13.

SUMMARY

According to an aspect of the embodiments, an apparatus calculates, based on job information indicating an attribute of a first job that is newly submitted and an attribute of each of a plurality of second jobs that have been executed, a first similarity level indicating a level of similarity of the job information between the first job and each of the plurality of second jobs by using a first calculation expression. The apparatus identifies, based on the first similarity level calculated for each of the plurality of second jobs, one of the plurality of second jobs whose job information is most similar to the job information of the first job as a first candidate job, and estimates, based on second job power consumption information indicating power consumption consumed by executing each of the plurality of second jobs, first power consumption to be consumed by executing the first job at power consumption indicated by the second job power consumption information of the first candidate job. The apparatus obtains, after the first job is executed, first job power consumption information indicating power consumption that has been consumed by executing the first job, and calculates, based on the first job power consumption information and the second job power consumption information, for at least one of the plurality of second jobs, a second similarity level indicating a level of similarity of power consumption between the first job and the at least one of the plurality of second jobs. The apparatus identifies, based on the second similarity level calculated for the at least one of the plurality of second jobs, one of the at least one of the plurality of second jobs whose second job power consumption information is most similar to the first job power consumption information as a second candidate job, and adjusts the first calculation expression to increase the first similarity level to be calculated between the first job and the second candidate job.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of power waveforms of jobs similar to each other with respect to job status information;

FIG. 11 illustrates an example of learning result information;

DESCRIPTION OF EMBODIMENTS

Even when the job submission information is similar, the pattern of power consumption may be dissimilar. Thus, there is a possibility that the actually measured value considerably differs from the estimated value when it is predicted that the pattern of power consumption of a newly submitted job is substantially identical to the pattern of power consumption of a job that has been executed in the past and that has the job submission information similar to that of the newly submitted job. When there is a significant difference with respect to an estimated value for a job, more significant difference is caused with regard to the estimation of total power of the system, resulting in the inaccurate estimation result.

In one aspect, it is desirable to improve the accuracy of estimation of power consumption for a job.

Hereinafter, embodiments will be described with reference to the drawings. The embodiments may be implemented by combining multiple embodiments with each other without any contradiction.

First Embodiment

Firstly, a first embodiment is described.

Figure 1:
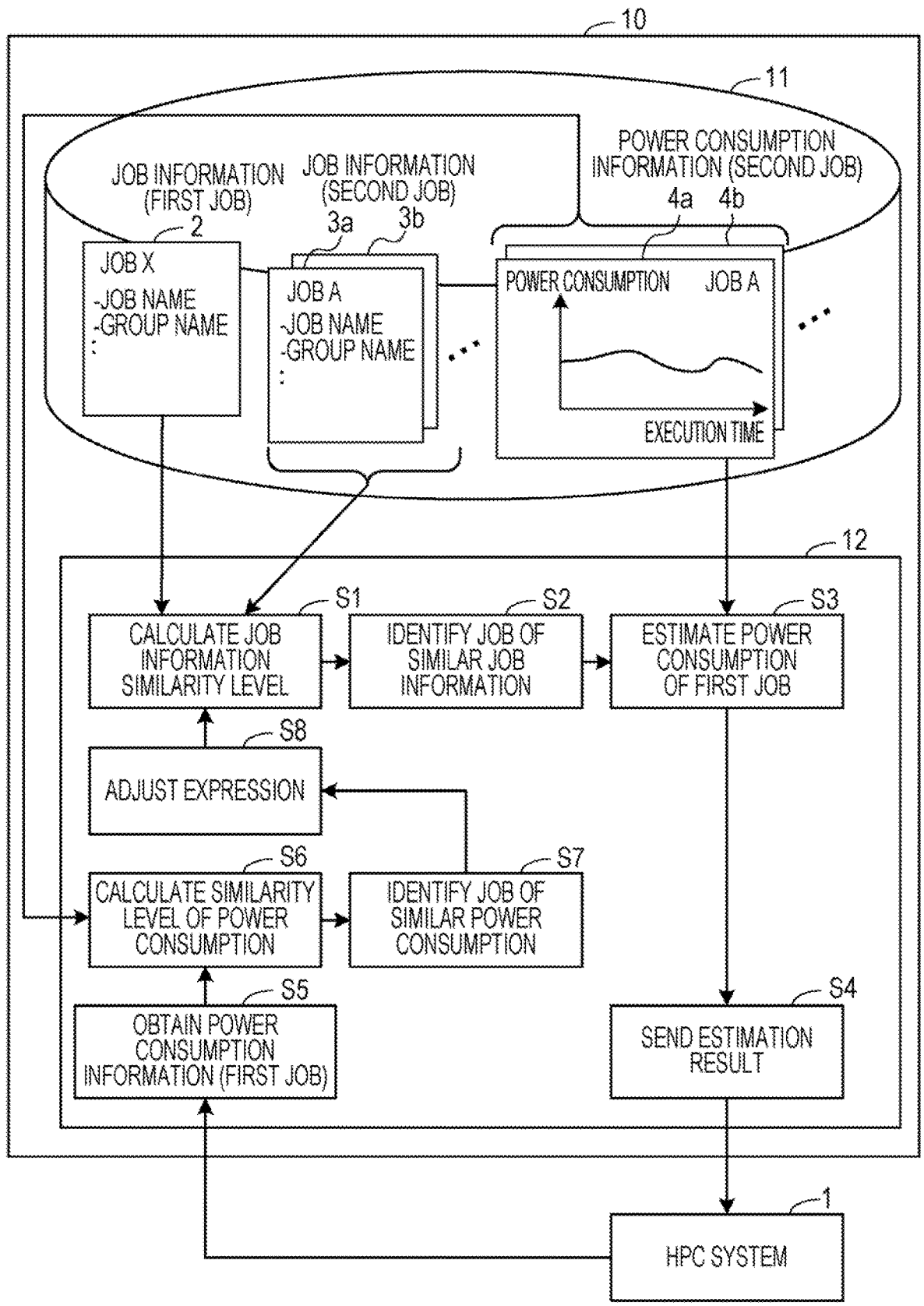
FIG. 1 illustrates an example of a method for estimating power for a job according to a first embodiment.

FIG. 1 illustrates an example of a method for estimating power for a job according to the first embodiment. FIG. 1 depicts an example in the case in which the method for estimating power for a job is implemented by using a job power estimation apparatus 10. The job power estimation apparatus 10 is able to implement the method for estimating power for a job by, for example, running a program for estimating power for a job. A procedure of processing of the method for estimating power for a job is written in the program.

The job power estimation apparatus 10 includes, for the purpose of implementing the method for estimating power for a job, a storage unit 11 and a processing unit 12. The storage unit 11 is, for example, a memory or a storage device included in the job power estimation apparatus 10. The processing unit 12 is, for example, a processor or an arithmetic circuit included in the job power estimation apparatus 10.

The job power estimation apparatus 10 is coupled to, for example, a high-performance computing (HPC) system 1. The job power estimation apparatus 10 estimates power consumption of a job that is newly submitted in the HPC system 1 and has not been executed and accordingly notifies the HPC system 1 of an estimation result. The HPC system 1 performs job scheduling to decrease the maximum value of power consumption of the entire system by using, for example, an estimated value of power consumption of the job.

The storage unit 11 of the job power estimation apparatus 10 stores job information 2, 3a, 3b, . . . that respectively indicate information about a first job, which is a newly submitted job, and a plurality of second jobs, which have been already executed. The job information 2, 3a, 3b, . . . each contain, for example, information about a user who ordered the submission of a corresponding job (for example, a user ID and a group ID) and conditions of running the corresponding job (for example, the number of nodes simultaneously used and an execution time). The storage unit 11 stores power consumption information 4a, 4b, . . . that respectively indicate power consumed by running the plurality of second jobs. The power consumption information 4a, 4b, . . . , each indicate, for example, time series fluctuations in power consumed by the HPC system 1 running a corresponding job by means of power waveform.

When detecting that, for example, the newly submitted first job exists, the processing unit 12 estimates the power consumption of the first job following the procedure described below.

The processing unit 12 firstly calculates a similarity level (a first similarity level) between the first job and each of the plurality of second jobs in accordance with the job information 2, 3a, 3b, . . . of the first job and the plurality of second jobs by using a given calculation expression (step S1). The processing unit 12 then identifies particular second jobs of similar job information in accordance with the similarity levels of job information calculated for each of the plurality of second jobs (step S2). The processing unit 12 estimates the power consumption to be consumed by executing the first job to be the power consumption indicated by power consumption information about a particular second job of similar job information in accordance with power consumption information about each of the plurality of second jobs (step S3). The processing unit 12 consequently sends the estimation result to the HPC system 1 (step S4).

After the HPC system 1 completes the execution of the first job, the processing unit 12 obtains from the HPC system 1 power consumption information (first job power consumption information) indicating power consumed by executing the first job (step S5). The processing unit 12 then calculates, with respect to at least one or more of the plurality of second jobs, a similarity level (a second similarity level) of power consumption between the first job and each of the at least one or more of the plurality of second jobs in accordance with the power consumption information about the first job and the power consumption information about the individual second jobs (step S6). The processing unit 12 identifies a particular second job of similar power consumption in accordance with the similarity levels of power consumption of the at least one or more of the plurality of second jobs (step S7). The processing unit 12 accordingly adjusts a calculation expression so as to increase the similarity level of job information between the first job and the particular second job of similar power consumption as compared to the state before adjustment (step S8).

As described above, the calculation expression for calculating the similarity level of job information is adjusted in accordance with power consumption information about an executed job, and as a result, it is possible to increase the similarity level of job information between jobs of similar power consumption. By repeating such adjustment, it is possible to accurately identify a job of power consumption similar to that of a newly submitted job in accordance with job information about the newly submitted job. Consequently, the accuracy of estimation of power consumption of a job is improved.

The job information 2, 3a, 3b, . . . are, for example, text data. In this case, a topic model may be utilized for calculating similarity levels of job information performed by the processing unit 12. The topic model is a statistical method for discovering a subject covered in text data. When the topic model is employed, the processing unit 12 calculates a topic distribution indicating the rate of occurrence of a particular topic contained in the job information about each of the first job and the plurality of second jobs. The processing unit 12 determines the similarity level of topic distribution between the first job and each of the plurality of second jobs as the similarity level of job information between the first job and each of the plurality of second jobs.

In addition, when the topic model is employed, the processing unit 12 is able to adjust the calculation expression by weighting each topic. For example, when calculating similarity levels of job information, the processing unit 12 uses weights of respective topics and calculates a similarity level of job information in accordance with the calculation expression in which the similarity level of job information increases as the value of weight assigned to a topic contained in the job information increases. When adjusting the calculation expression, the processing unit 12 increases the value of weight of a topic contained in the job information about a particular second job of similar job information.

Figure 2:
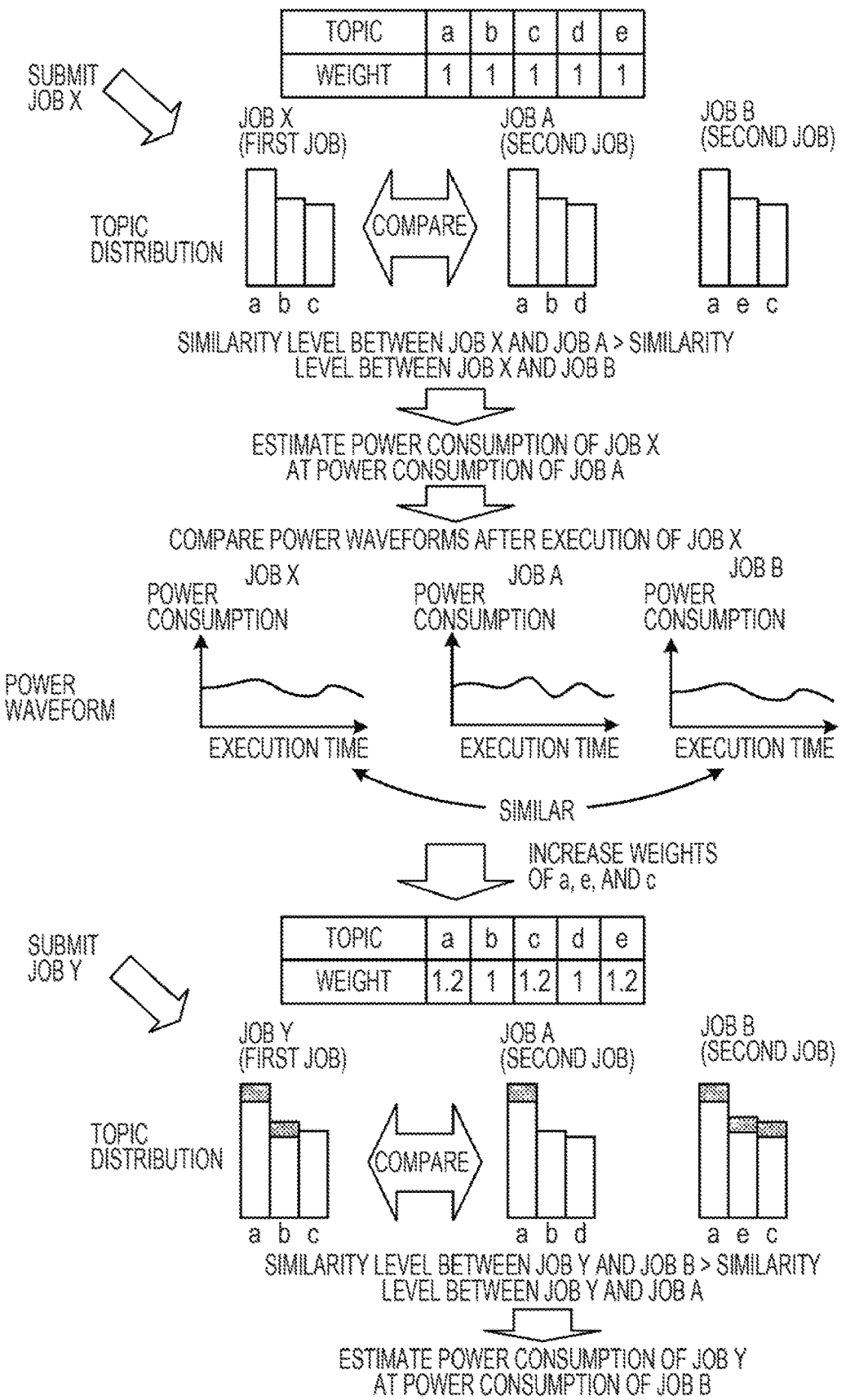
FIG. 2 illustrates an example of adjustment of a calculation expression by individually weighting topics.

FIG. 2 illustrates an example of adjustment of the calculation expression by individually weighting topics. For example, the case of newly submitting a job X is assumed. The job X corresponds to the first job in the description of FIG. 1. Jobs A and B are jobs having been executed. The jobs A and B correspond to the second jobs in the description of FIG. 1.

The processing unit 12 calculates a topic distribution in accordance with the job information about each job. The topic distribution indicates the frequencies of occurrence of topics in the job information by using numerical values. The topic distribution of the job X indicates, in order starting from the highest rate of occurrence, topics a, b, and c. The topic distribution of the job A indicates, in order starting from the highest rate of occurrence, topics a, b, and d. The topic distribution of the job B indicates, in order starting from the highest rate of occurrence, topics a, e, and c.

At this time, it is assumed that the weights of respective topics are identical to each other. The topics a and b are common between the topic distribution of the job X and the topic distribution of the job A. The topics a and c are common between the topic distribution of the job X and the topic distribution of the job B. The value representing the rate of occurrence of the topic b in the jobs X and A is greater than the value representing the rate of occurrence of the topic c in the jobs X and B. Accordingly, the similarity level between the jobs X and A is higher than the similarity level between the jobs X and B.

In this case, the processing unit 12 estimates the power consumption of the job X to be the power consumption of the job A. After the job X is executed, actually measured values (a power waveform) of the power consumption of the job X is obtained. The processing unit 12 compares the power waveform of the job X with both the power waveform of the job A and the power waveform of the job B. In the example in FIG. 2, the power waveform of the job B is more similar to the power waveform of the job X. Accordingly, the processing unit 12 increases the weights for the topics a, e, and c contained in the topic distribution of the job B. In the calculation of topic distribution, the numerical value representing the rate of occurrence of a topic of which the weight is increased becomes greater than the state before the adjustment of weight.

Afterward, for example, it is assumed that a job Y of job information indicating a topic distribution substantially identical to that of the job X is newly submitted. For example, when a user who ordered the execution of the job X slightly modifies the program for executing jobs and then orders the execution of the job Y with which the modified program is run, the job information about the job Y is substantially identical to the job information about the job X.

In accordance with the job information about each job, the processing unit 12 calculates a topic distribution by using weights after adjustment. As a result, in the topic distribution of each job, the values of topics assigned greater weights become greater than the values before the adjustment of weight. The increased portions caused by weights are indicated by cross-hatching in FIG. 2. Resulting from the difference in weight, the value representing the rate of occurrence of the topic c in the jobs Y and B is greater than the value representing the rate of occurrence of the topic b in the jobs Y and A. As a consequence, the similarity level between the jobs Y and B is greater than the similarity level between the jobs Y and A.

In this case, the processing unit 12 estimates the power consumption of the job Y to be the power consumption of the job B. The job Y is executed under substantially the same condition as that of the job X and it is considered that the power waveform of the job Y is identical to the power waveform of the job X. The power waveform of the job B is similar to the power waveform of the job X, while the processing unit 12 estimates the power consumption of the job Y to be the power consumption of the job B, and therefore, it is possible to say that the accurate estimation is achieved. As described above, adjusting weights of individual topics improves the accuracy of estimation of power consumption of a job.

When only the weight of a topic contained in the topic distribution of a job of similar power consumption is increased, the weight of a topic of a lower frequently of occurrence remains relatively low. In this case, when the topic distribution of the first job newly executed contains a topic of a lower frequency of occurrence, the existence of the topic is not considered, and as a result, the accuracy of estimation of power may be decreased. In this regard, the processing unit 12 may select either the calculation expression using weights of respective topics or a calculation expression without adjustment not using weights of respective topics to calculate a similarity level of job information. For example, the processing unit 12 determines, in accordance with weights of topics contained in the job information about the first job, whether to use the calculation expression using weights of respective topics or the calculation expression without adjustment not using weights of respective topics. Depending on the determination result, the processing unit 12 calculates a similarity level of job information by employing the calculation expression using weights or the calculation expression without adjustment not using weights. This hinders the deterioration of accuracy of power estimation in the case in which the topic distribution of the first job includes a topic of a low frequency of occurrence.

When calculating a similarity level of power consumption information, the processing unit 12 may calculate a similarity level of power consumption information with respect to, for example, a predetermined number of the second jobs successively in order starting from the highest similarity level of job information to the first job. Particular second jobs that are dissimilar from the start in terms of job information are inappropriate for being used as a base for adjusting the calculation expression for calculating a similarity level of job information. For example, when the power waveform of a second job that is dissimilar in terms of job information is similar to the power waveform of the first job, the similarity of job information does not reflect the factor contributing the similarity between the power waveforms. Thus, by calculating a similarity level of power consumption information for each of a predetermined number of the second jobs successively in order starting from the highest similarity level of job information to the first job, it is possible to reduce the amount of calculation and also to hinder inappropriate adjustment of the calculation expression for calculating a similarity level of job information.

The processing unit 12 may calculate similarity levels of power consumption information for particular second jobs of which the similarity level of job information to the first job is equal to or higher than a threshold. By calculating similarity levels of power consumption information for particular second jobs of which the similarity level is equal to or higher than a threshold, it is possible to hinder a second job of the most similar power consumption from being excluded from targets for calculation of similarity level of power consumption information when a large number of second jobs indicate relatively high similarity levels.

Second Embodiment

Next, a second embodiment is described. The second embodiment estimates power consumption of a job submitted to the HPC system and appropriately manages power consumption of the entire system.

Figure 3:
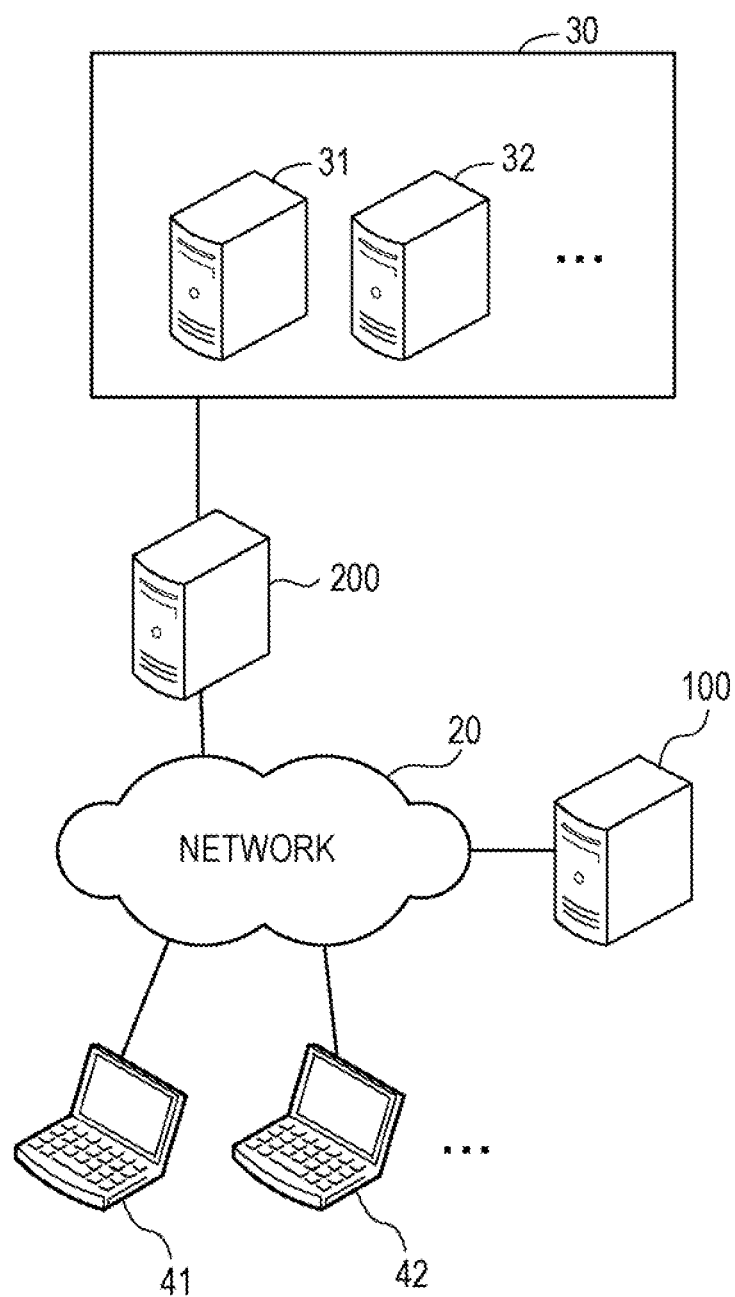
FIG. 3 illustrates an example of a system configuration according to a second embodiment.

FIG. 3 illustrates an example of a system configuration according to the second embodiment. An HPC system 30 involves a plurality of compute nodes 31, 32, . . . . The compute nodes 31, 32, . . . are computers that execute a submitted job.

The compute nodes 31, 32, . . . in the HPC system 30 are coupled to an HPC operation management server 200. The HPC operation management server 200 is a computer that manages the operation of the HPC system 30. For example, the HPC operation management server 200 monitors time series fluctuations in power consumption of the compute nodes 31, 32, . . . during the execution of a job. The HPC operation management server 200 also receives, with respect to a job waiting for execution, an estimation result of the pattern of power consumption of the job from a management server 100 and performs job scheduling to, for example, equalize power consumption in the system. The HPC operation management server 200 instructs the compute nodes 31, 32, . . . to execute a job according to the generated schedule for executing a job.

The HPC operation management server 200 is coupled to terminal devices 41, 42, . . . and the management server 100 via a network 20. The terminal devices 41, 42, . . . are computers that are used by users who desires to execute jobs by using the HPC system 30. The terminal devices 41, 42, . . . generate, in accordance with user's inputs, job information indicating details of jobs to be executed by the HPC system 30 and send to the HPC operation management server 200 requests that ask for submitting jobs and that contain the generated job information.

The management server 100 is a computer that assists the HPC operation management server 200 to manage power consumption of the HPC system 30. The management server 100 obtains from the HPC operation management server 200 the job information about a job to be executed and power information indicating the pattern of power consumption of jobs having been executed. The management server 100 estimates the pattern of power consumption of a job waiting for execution in accordance with the information obtained from the HPC operation management server 200. The management server 100 then sends to the HPC operation management server 200 the estimation result about the pattern of power consumption of the job.

Figure 4:
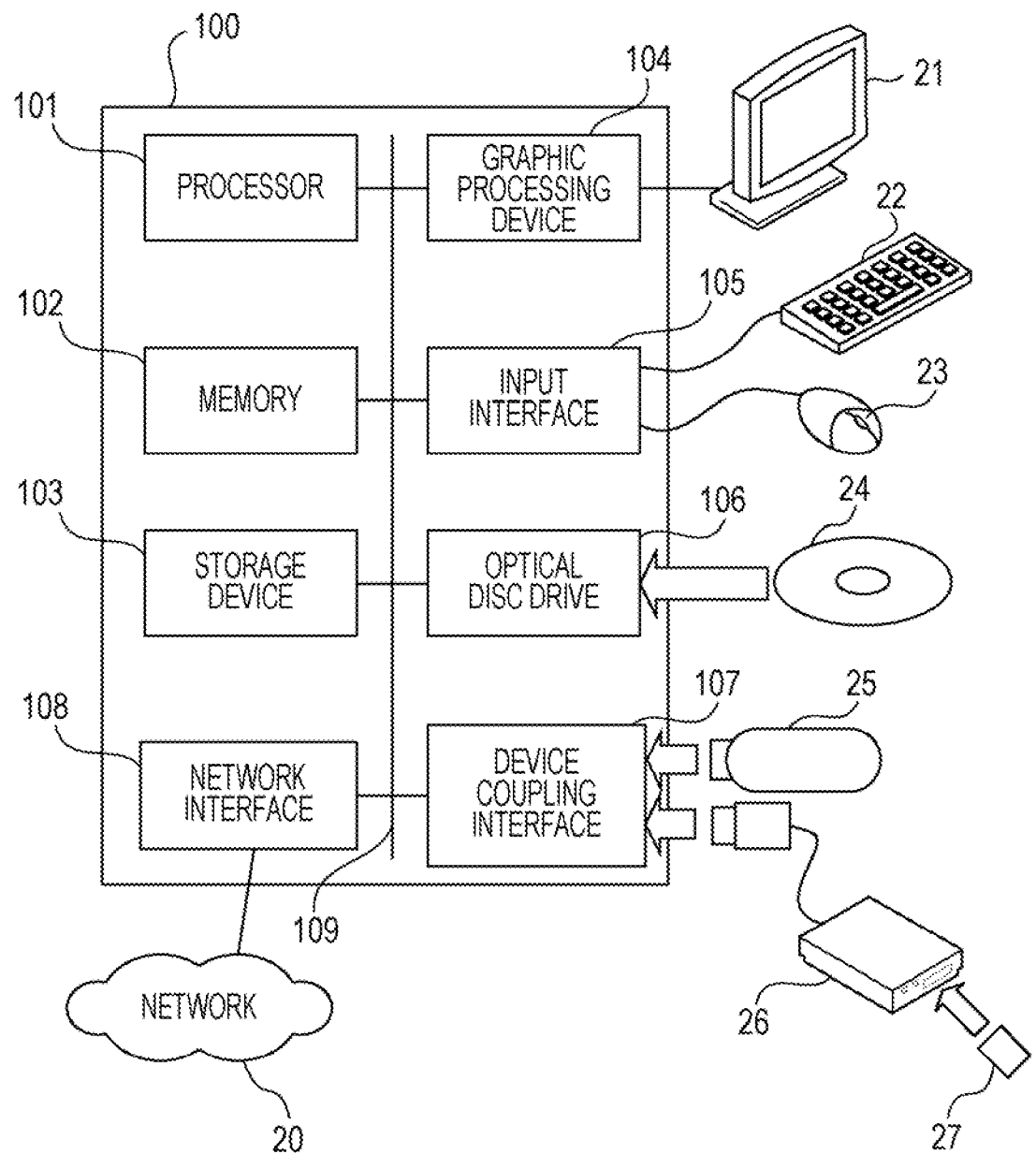
FIG. 4 illustrates an example of a hardware configuration of a management server.

FIG. 4 illustrates an example of a hardware configuration of the management server. The management server 100 is entirely controlled by a processor 101. A memory 102 and a plurality of peripheral devices are coupled to the processor 101 via a bus 109. The processor 101 may be multiple processors. The processor 101 is, for example, a central processing unit (CPU), a microprocessor unit (MPU), or a digital signal processor (DSP). At least one or more of the functions implemented by the processor 101 running a program may be implemented by electronic circuits such as application specific integrated circuits (ASICs) or programmable logic devices (PLDs).

The memory 102 is used as a primary storage device of the management server 100. The memory 102 temporarily stores at least one or more of the operating system (OS) program and the application programs that are run by the processor 101. The memory 102 also stores various types of data that are used for processing performed by the processor 101. A volatile semiconductor storage device, such as a random-access memory (RAM), is used as the memory 102.

The peripheral devices coupled to the bus 109 include a storage device 103, a graphics processing device 104, an input interface 105, an optical disc drive 106, a device coupling interface 107, and a network interface 108.

The storage device 103 electrically or magnetically reads and writes data from and to a recording medium inserted in the storage device 103. The storage device 103 is used as an auxiliary storage device of the computer. The storage device 103 stores the OS program, the application programs, and the various types of data. Examples of device used as the storage device 103 include a hard disk drive (HDD) and a solid-state drive (SSD).

A monitor 21 is coupled to the graphics processing device 104. The graphics processing device 104 causes the monitor 21 to display images on the screen of the monitor 21 in accordance with an instruction provided by the processor 101. Examples of the monitor 21 include a display device using the organic electro luminescence (EL) technology and a liquid crystal display device.

A keyboard 22 and a mouse 23 are coupled to the input interface 105. The input interface 105 transmits to the processor 101 signal transmits from the keyboard 22 or the mouse 23. The mouse 23 is an example of a pointing device and another kind of pointing device may be used. Examples of the other kind of pointing device include a touch panel, a tablet computer, a touch pad, and a trackball.

The optical disc drive 106 reads, by using, for example, laser light, data recorded in an optical disk 24. The optical disk 24 is a portable recording medium that records data in a manner in which the data is readable by using the reflection of light. Examples of the optical disk 24 include a digital versatile disc (DVD), a DVD-RAM, a compact disc read-only memory (CD-ROM), and a compact disc-recordable (CD-R)/rewritable (CD-RW).

The device coupling interface 107 is a communication interface for coupling the peripheral devices to the management server 100. For example, a memory device 25 and a memory reader/writer 26 are coupled to the device coupling interface 107. The memory device 25 is a recording medium having a function of communicating with the device coupling interface 107. The memory reader/writer 26 is a device that reads and writes data from and to a memory card 27. The memory card 27 is a card-type recording medium.

The network interface 108 is couple to the network 20. The network interface 108 transmits and receives data to and from another computer or another communication device via the network 20.

The management server 100 is able to implement functions according to the second embodiment by employing the hardware configuration described above. The compute nodes 31, 32, . . . , the HPC operation management server 200, and the terminal devices 41, 42, . . . are all able to be implemented by using the hardware devices identical to those of the management server 100. The compute nodes 31, 32, . . . each includes an interconnect interface for establishing communicating among the compute nodes 31, 32, . . . . The job power estimation apparatus 10 according to the first embodiment illustrated in FIG. 1 is also able to be implemented by using the hardware devices identical to those of the management server 100 illustrated in FIG. 4.

The management server 100 implements processing functions according to the second embodiment by, for example, running a program recorded in a computer-readable recording medium. The program in which details of processing to be performed by the management server 100 are written is able to be recorded in various recording media. For example, the program to be run by the management server 100 is able to be stored in the storage device 103. The processor 101 loads at least part of the program stored in the storage device 103 into the memory 102 and runs the program. The program to be run by the management server 100 is also able to be recorded in a portable recording medium such as the optical disk 24, the memory device 25, or the memory card 27. The program stored in the portable recording medium is executable after, for example, the program is installed in the storage device 103 under the control of the processor 101. The processor 101 may read the program directly from the portable recording medium to run the program.

In the system illustrated in FIG. 3, the HPC operation management server 200 and the management server 100 cooperate with each other to appropriately perform power management based on the estimation result of the pattern of power consumption for each job unit. For example, the management server 100 estimates the time series fluctuations in power consumption at the time of executing a newly submitted job. The time series fluctuations in power consumption is presented by, for example, a power waveform. The HPC operation management server 200 performs, in accordance with the power waveform of the newly submitted job, job scheduling so as to, for example, maintain the maximum power consumption in the HPC system 30 at a relatively low level.

The management server 100 may estimate the power waveform of a newly submitted job to be the power waveform of a particular job similar to the newly submitted job among jobs having been executed. For this purpose, the management server 100 firstly, for example, identifies a job similar to the newly submitted job. The similarity level between jobs may be represented by a similarity level of information (hereinafter referred to as job status information) indicating the status of a job such as a user ID of a user who inputs a request for executing the job, the type of the job, and the degree of parallelization at the time of executing the job (this denotes how many compute nodes execute the job). The job status information is an example of the job information described in the first embodiment.

The job status information about each job is a document containing a plurality of combinations each consisting of a field name regarding the job status and a value corresponding to the field. An example of the technology usable for computing the similarity level between documents is a latent dirichlet allocation (LDA) estimation model. For example, the management server 100 computes a topic distribution indicated by the job status information about each job by using the LDA estimation model and determines the similarity level of topic distribution between jobs as the similarity level between the jobs.

The LDA estimation model is a kind of the topic model. The topic model is a model in which it is assumed that a document is generated from a plurality of latent topics in accordance with the probability; more specifically, words in a document occurs in accordance with the probability distribution of each topic. By employing the LDA estimation model, it is possible to estimate the combination ratio of topics seen in each document from a collection of document data targeted for analysis.

The dirichlet distribution, which is a conjugate prior distribution of multinomial distribution, is used for generating a topic distribution of each document. The dirichlet distribution is expressed by the following expression.

$$Dir(x \mid a) = \frac{\Gamma\left(\sum_{k=1}^{K} a_k\right)}{\prod_{k=1}^{K} \Gamma(a_k)} \prod_{k=1}^{K} x_k^{a_k-1} \quad (1)$$

$$x = \{x_1, \ldots, x_K\}, 0 \le x_k \le 1, \sum_{k=1}^{K} x_k = 1$$

$$a = \{a_1, \ldots, a_K\}, a_k > 0$$

Expression (1) denotes a probability in which a vector x occurs with a parameter vector α. Γ is the gamma function. The vector x is a real vector indicating a random variable. K is the number of topics. k is an index of a particular topic.

The management server 100 examines which words occurs in each document (the job status information) of a job status information group serving as a training data set. The management server 100 counts how often a particular word occurs in a particular document, groups words that occurs in the same document at relatively high degrees, and determines the grouped words as a topic.

Specifically, the management server 100 calculates the probability with respect to individual documents and individual words by using the following expression (2).

$$P(z_{d,n} = k \mid w_{d,n} = v, w^{\backslash d,n}, z^{\backslash d,n}, \alpha, \beta) \propto \frac{N_{k,v}^{\backslash d,n} + \beta}{N_k^{\backslash d,n} + \beta V}(N_{d,k}^{\backslash d,n} + \alpha) \quad (2)$$

N is the total number of words in a collection of documents. V is the total number of kinds of word (the number of kinds of words contained in the entire collection of documents). d is an index of a particular document. n is an index of a particular word. v is an index of a particular kind of word. w is a particular word. z is a particular topic. A backslash indicates the difference with respect to a collection. β is a parameter of word distribution. Expression (2) is a sampling expression expressing a topic $z_{d,n}$ of a word $w_{d,n}$ in a document d.

The management server 100 determines as a topic a combination of words about which relatively higher probabilities are obtained by using expression (2). The relatively higher probabilities denote, for example, probabilities equal to or higher than a given value. As the result of performing learning by employing the LDA estimation model, the management server 100 obtains a collection of word belonging to a topic.

The management server 100 calculates a topic distribution of the job status information about each job in accordance with the topics to which words contained in the job status information about the job belong. The management server 100 compares jobs with regard to the topic distribution generated based on the job status information about each job, and as a result, the management server 100 is able to compute a similarity level between the jobs.

For example, the management server 100 determines a particular job similar to a newly submitted job by using the similarity level of topic distribution. For example, the management server 100 computes a cosine similarity between topic distributions and accordingly computes a similarity level between jobs.

Figure 5:
FIG. 5 illustrates an example of computation of similarity level.

FIG. 5 illustrates an example of computation of similarity level. The management server 100 computes a topic distribution for each job. The topic distribution is able to be expressed by a vector in which the index of a topic serves as an element number and the value of the frequency of occurrence of the topic in a document (job status information) serves as an element. The management server 100 computes a cosine similarity between a vector representing the topic distribution of a newly submitted job and a vector representing the topic distribution of a job having been executed and determines the computed cosine similarity as the similarity level between the jobs. With this configuration, as the number of topics commonly included in the topic distributions of jobs targeted for comparison increases, the similarity level rises.

The management server 100 may compute a similarity level between the topic included in the topic distribution of a newly submitted job and the topic included in the topic distribution of a job having been executed and accordingly compute a similarity level between the topic distributions. For example, the management server 100 determines the total of similarity levels among topics included in topic distributions targeted for comparison as the similarity level of the topic distributions.

The management server 100 is able to measure a similarity level $S_{kk'}$ between topics by employing, for example, a vector space method. In the vector space method, the similarity level is defined as the cosine between occurrence frequency vectors of different topics with regard to the respective kinds of word in a word kind space V. The similarity level between a kth topic and a k'th topic is expressed by the following expression.

$$S_{kk'} = \frac{n_k \cdot n_{k'}}{|n_k||n_{k'}|} \quad (3)$$

$n_k$ is an occurrence frequency vector of the kth topic. $n_{k'}$ is an occurrence frequency vector of the k'th topic.

As described above, by employing the LDA estimation model, it is possible to compute a topic distribution for each job and consequently compute the similarity level between jobs in accordance with the similarity level between the topic distributions. The management server 100 then may estimate the power waveform of a newly submitted job to be the power waveform of a particular job most similar to the newly submitted job among jobs having been executed.

It is noted that the actual power waveform of a newly submitted job may differ from the power waveform of a job of the most similar topic distribution in some cases.

FIG. 6 illustrates an example of power waveforms of jobs similar to each other with respect to the job status information. The example in FIG. 6 indicates a comparison result between a job of a job ID "6960998" and a job of a job ID "6958268".

Job status information 91 about the job of the job ID "6960998" and job status information 92 of the job of the job ID "6958268" are similar to each other because many words are common to both. Thus, when topic distributions are generated by employing the LDA estimation model, the generated topic distributions are of a relatively high similarity level.

Comparing power waveforms 93 and 94 of power consumption at the time when the jobs are executed, the power waveforms 93 and 94 are significantly different from each other. Specifically, the job of the job ID "6958268" spends 30 seconds to complete the execution and consumes approximately 50 kw power at a maximum. In contrast, the job of the job ID "6960998" completes the execution within 5 seconds and the power consumption during the period is approximately 2 kw, which is relatively low.

As described above, simply employing only the LDA estimation model may cause inaccurate estimation of power waveform when there is a similarity between jobs with respect to the job status information but the power waveforms of the jobs are different from each other. The management server 100 compares the power waveforms of a predetermined number of jobs selected in order starting from the highest ranking regarding the similarity of topic distribution with respect to a newly submitted job with the power waveform obtained after the newly submitted job has been executed. The management server 100 generates the LDA estimation model for adjustment that is modified, by using the topic distributions of the jobs indicating power waveforms similar to that of the newly submitted job, to increase the similarity level between the jobs similar to each other with regard to the power waveform. For example, in the calculation using expression (2), the management server 100 performs weighting to increase the weights of topics indicated in the topic distribution of a job of a similar power waveform. For example, when calculating the probability that particular words relating to a particular topic would be generated, the management server 100 changes the value of β in expression (2) in accordance with the weight of the particular topic. Increasing the value of β increases the probability that particular words relating to the particular topic, and as a result, the quantity of words representing the particular topic is also increased. Consequently, when the topic distribution of each document is generated, the value of the particular topic is increased.

Hereinafter, a method for managing power in the HPC in accordance with the job power consumption estimated by using the LDA estimation model for adjustment is described in detail.

Figure 7:
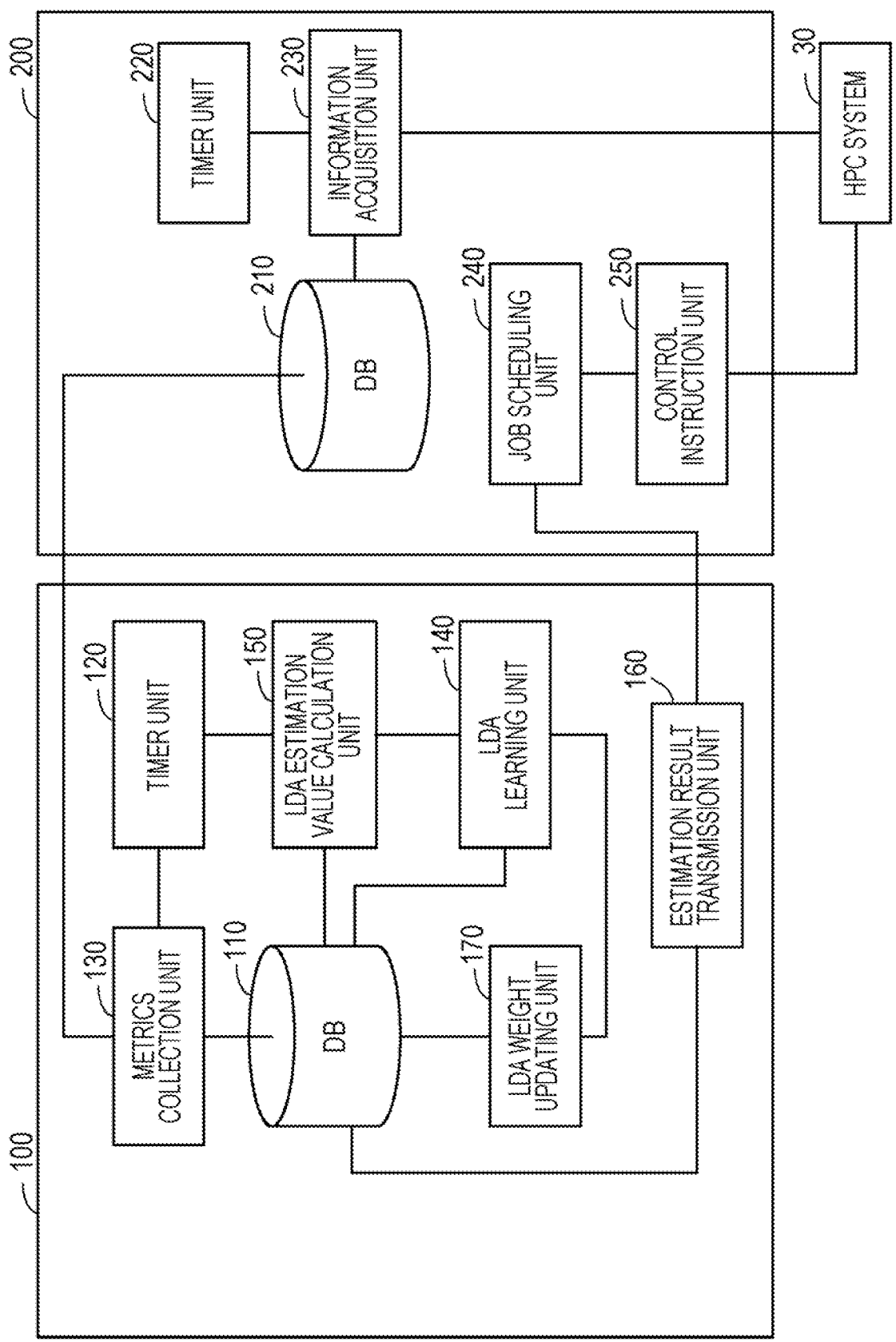
FIG. 7 is a block diagram illustrating functions of apparatuses for power management.

FIG. 7 is a block diagram illustrating functions of apparatuses for power management. The HPC operation management server 200 includes a database (DB) 210, a timer unit 220, an information acquisition unit 230, a job scheduling unit 240, and a control instruction unit 250.

The DB 210 stores, for example, job status information indicating the status of a job to be performed and job power consumption information indicating the time series fluctuations of power consumption of a job having been executed.

The timer unit 220 manages time of collecting the power consumption information about each job from the HPC system 30. For example, the timer unit 220 instructs, at fixed intervals, the information acquisition unit 230 to collect the job power consumption information.

The information acquisition unit 230 obtains from the HPC system 30 time series data about power with respect to a job having been executed in the HPC system 30 in response to the instruction provided by the timer unit 220. The information acquisition unit 230 stores the obtained power consumption information in the DB 210.

The management server 100 includes a DB 110, a timer unit 120, a metrics collection unit 130, an LDA learning unit 140, an LDA estimation value calculation unit 150, an estimation result transmission unit 160, and an LDA weight updating unit 170.

The DB 110 stores information to be used for estimating the pattern of power consumption of each job. The timer unit 120 manages time for estimating the pattern of power consumption of a job not yet executed. For example, the timer unit 120 instructs, at fixed intervals, the metrics collection unit 130 to collect information from the HPC operation management server 200. The timer unit 120 also instructs, at fixed intervals, the LDA estimation value calculation unit 150 to estimate the pattern of power consumption.

The metrics collection unit 130 collects information from the HPC operation management server 200 in response to the instruction provided by the timer unit 120. For example, the metrics collection unit 130 obtains from the HPC operation management server 200 the job status information about a job waiting for execution, the job status information about a job having been executed, and the time series data about power indicating the pattern of power consumption of the job having been executed. The metrics collection unit 130 stores the obtained information in the DB 110.

The LDA learning unit 140 generates the LDA estimation model in accordance with the job information. For example, the LDA learning unit 140 analyzes words included in the job information with respect to a plurality of jobs and classifies the words into the groups for the respective topics. The LDA learning unit 140 stores the learning result in the DB 110.

The LDA estimation value calculation unit 150 estimates the pattern of power consumption of a job waiting for execution in accordance with the LDA estimation model. For example, the LDA estimation value calculation unit 150 identifies a particular job that has been executed and that is similar to a job targeted for estimation with respect to the job information and accordingly estimates the pattern of power consumption of the job targeted for estimation to be the pattern of power consumption of the identified job. The LDA estimation value calculation unit 150 stores, for example, the estimation result in the DB 110.

The estimation result transmission unit 160 sends the estimation result regarding the pattern of power consumption of the job waiting for execution to the HPC operation management server 200.

The LDA weight updating unit 170 updates the weights of topic to be used for generating the LDA estimation model. For example, the LDA weight updating unit 170 determines a job lately having been executed as a target job and identifies a similar job that is most similar to the target job with regard to the pattern of power consumption among a given number of similar jobs that are similar to the target job with regard to the job information. The LDA weight updating unit 170 computes a topic distribution of the identified similar job in accordance with the job information and increases weights of topics indicated in the topic distribution. The LDA weight updating unit 170 stores the updated weights of the topics in the DB 110.

The line coupling the elements illustrated in FIG. 7 represents part of communication path and other communication paths other than the communication path may also be configured. The functions of the elements illustrated in FIG. 7 may be implemented by, for example, a computer in accordance with program modules corresponding to the elements.

Figure 8:
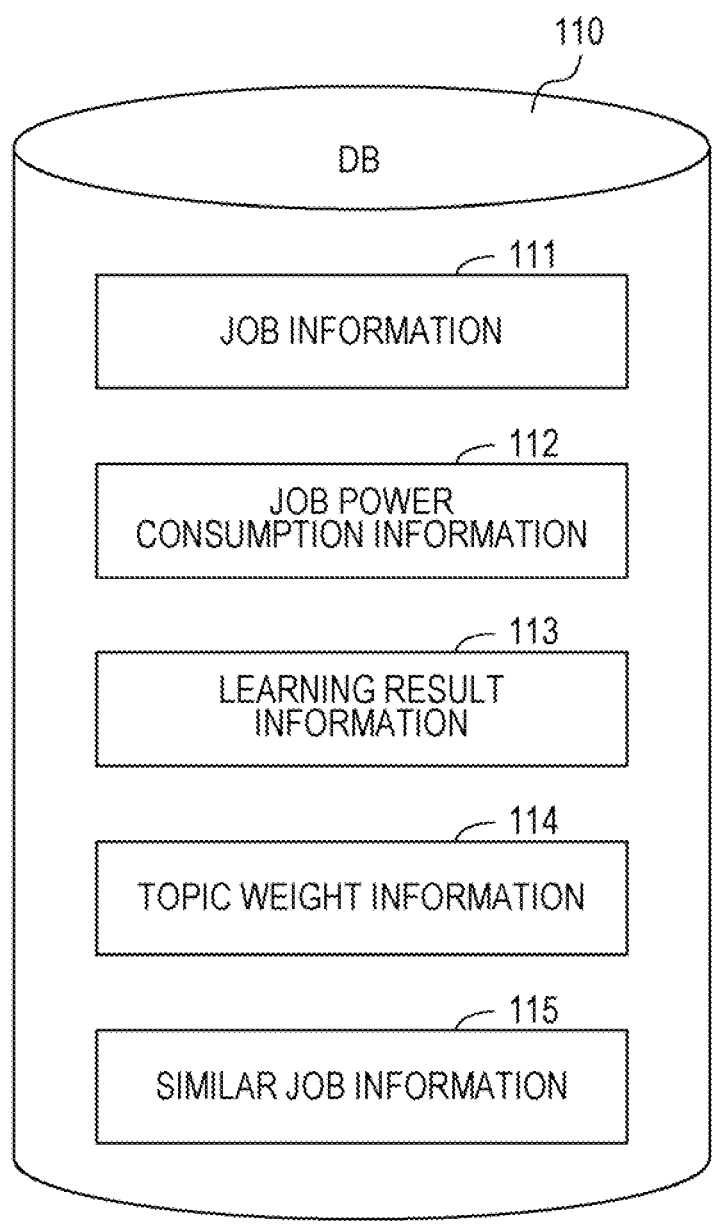
FIG. 8 illustrates an example of information stored in a database (DB) in the management server.

FIG. 8 illustrates an example of information stored in the DB in the management server. In the example in FIG. 8, the DB 110 stores job information 111, job power consumption information 112, learning result information 113, topic weight information 114, and similar job information 115.

The job information 111 is job status information for each job such as a job name. The job power consumption information 112 is time series information about power consumption of a job having been executed. The learning result information 113 is information indicating a learning result obtained by employing LDA. The topic weight information 114 is information indicating a weight value for each topic. The similar job information 115 is information indicating a particular job similar to a job targeted for estimating power consumption.

Figure 9:
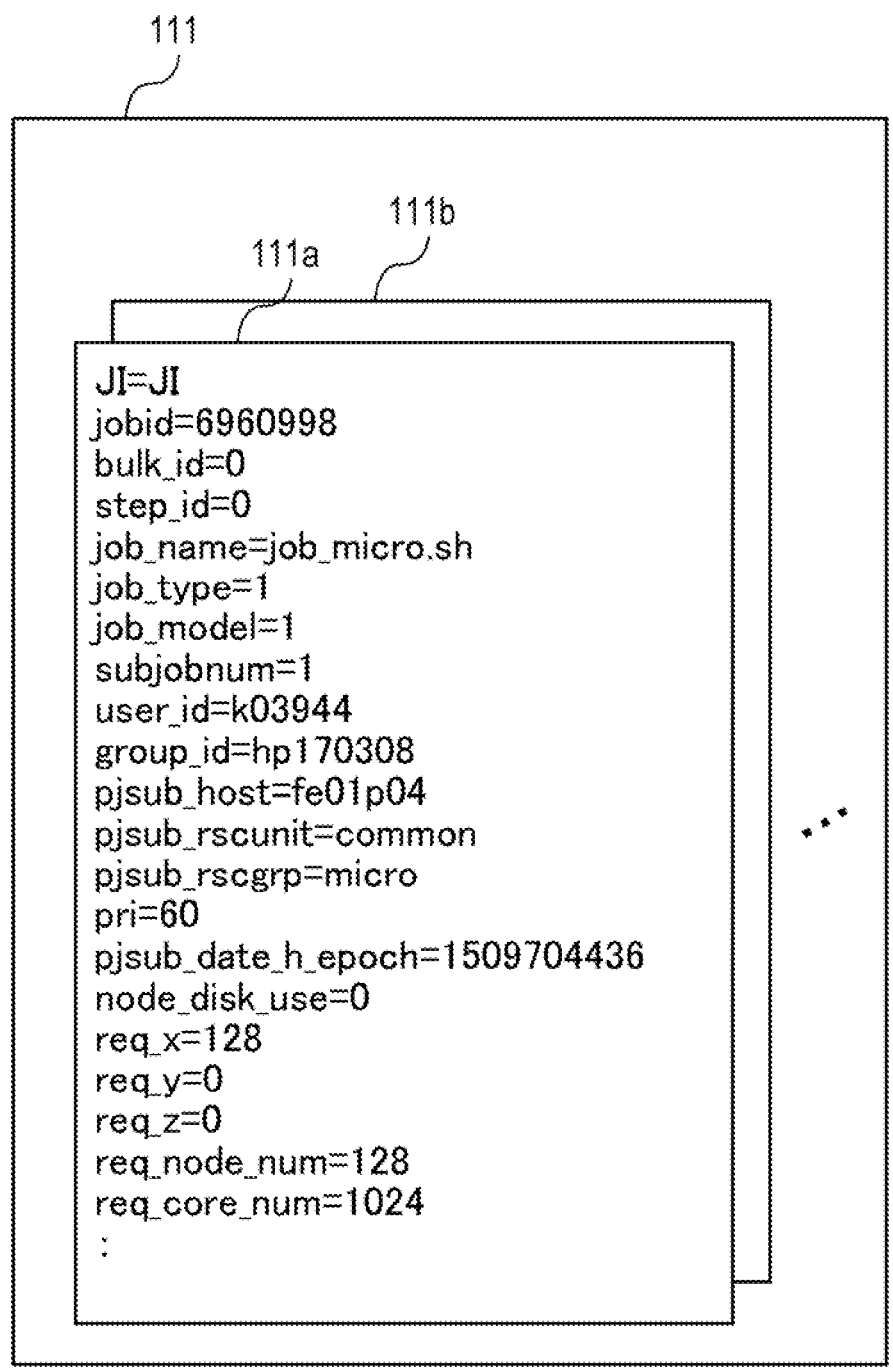
FIG. 9 illustrates an example of job information.

FIG. 9 illustrates an example of the job information. The job information 111 includes, for example, job status information 111a, 111b, . . . for individual jobs. The job status information 111a, 111b, . . . each contain various kinds of information regarding the execution of a particular job such as a job ID, a job name, a user name of a user who request execution of a corresponding job, and a group ID of a group to which the user belongs.

Figure 10:
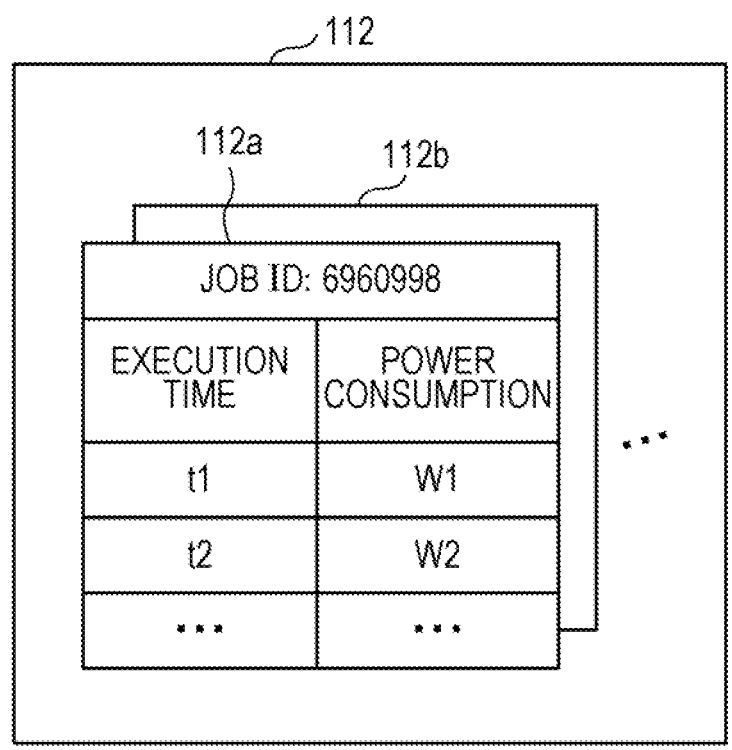
FIG. 10 illustrates an example of job power consumption information.

FIG. 10 illustrates an example of the job power consumption information. The job power consumption information 112 includes, for example, time series data about power 112a, 112b, . . . for individual jobs that have been executed. The time series data about power 112a, 112b, . . . each indicate power consumption per execution time in association with, for example, a job ID. The execution time indicates a time that elapses since the execution of a corresponding job is started in the power measuring process. The power measuring process is performed by compute nodes at, for example, predetermined time intervals. The power consumption indicates the amount of power consumption that is increased in the compute nodes due to the execution of the job.

FIG. 11 illustrates an example of the learning result information. The learning result information 113 includes, for example, learning results 113a and 113b for the respective estimation models for classifying words contained in job information into a plurality of topics. The learning result 113a is a learning result obtained by employing the LDA estimation model. The learning result 113b is a learning result obtained by employing the LDA estimation model for adjustment. The LDA estimation model for adjustment is formed by performing weighting for respective topics based on the LDA estimation model. In the learning results 113a and 113b, words belonging to topics are recorded in association with corresponding topic numbers indicating individual topics.

Figures 12, 13:
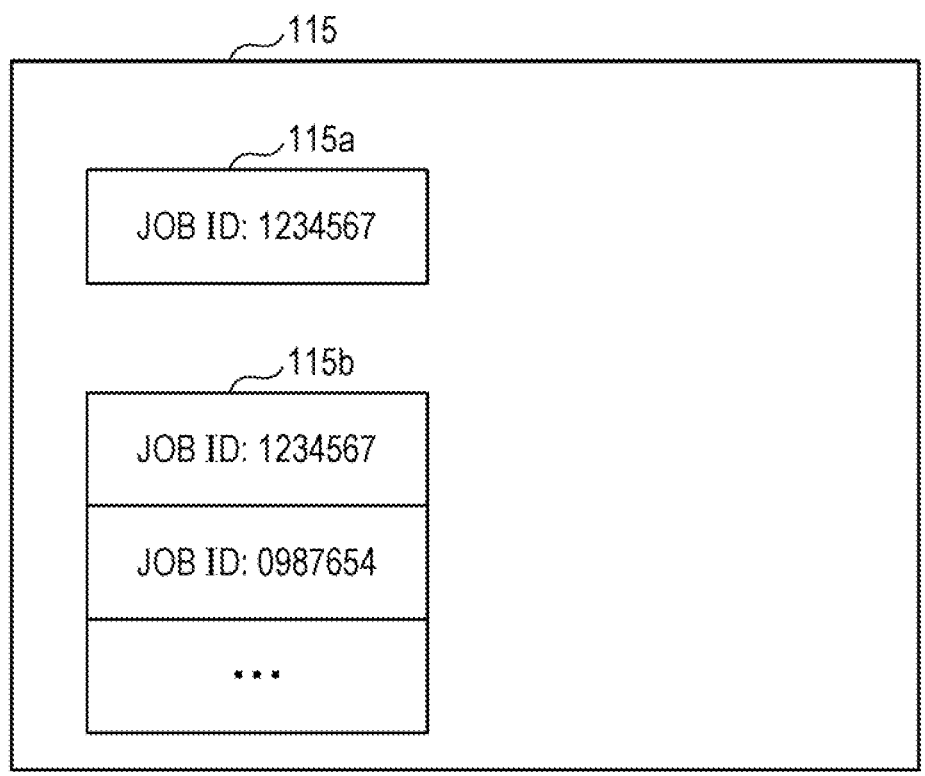
FIG. 12 is an example of topic weight information.
FIG. 13 illustrates an example of similar job information.

FIG. 12 is an example of the topic weight information. In the topic weight information 114, a weight is set for a topic number of each topic. The weights of topics are updated by, for example, the LDA weight updating unit 170 every time the execution of a new job is completed. The weight of a topic is used as, for example, the value of β when the calculation regarding the topic is performed in accordance with expression (2).

FIG. 13 illustrates an example of the similar job information. For example, the similar job information 115 includes a similar job 115a or a similar job list 115b that are determined in accordance with the learning results 113a and 113b of the respective estimation models with respect to a job targeted for estimating power consumption. For example, the similar job 115a indicates a job ID that is determined as the job ID of a job most similar to the target job in accordance with the learning result 113a of the LDA estimation model. Alternatively, the similar job list 115b indicates job IDs that are determined as the job IDs of a predetermined number of jobs similar to the target job in accordance with the learning result 113b of the LDA estimation model for adjustment.

Next, the method for estimating power consumption of a job by employing the LDA estimation model and the LDA estimation model for adjustment is specifically described.

Figure 14:
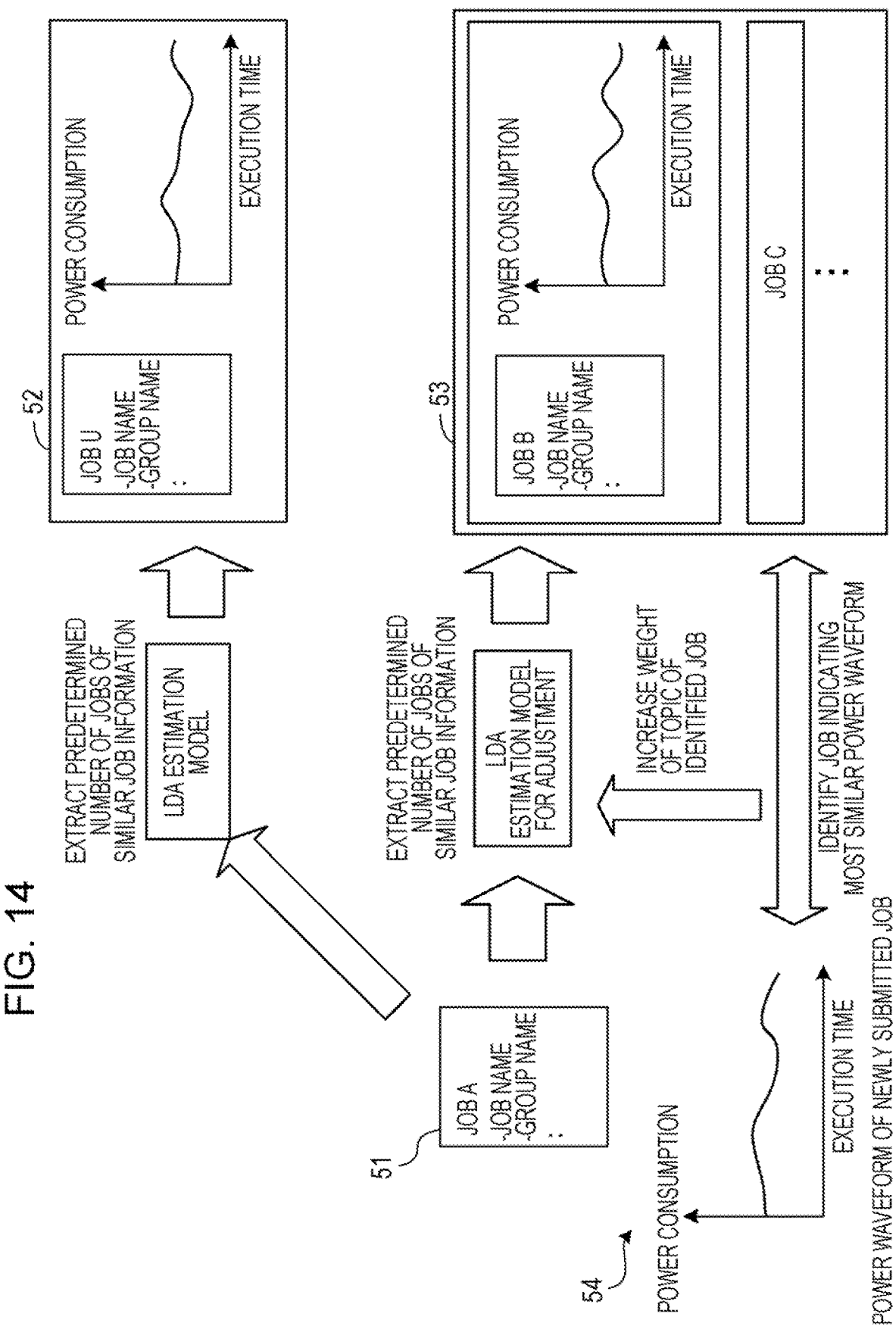
FIG. 14 illustrates an example of the method for estimating power consumption of a job by employing a latent dirichlet allocation (LDA) estimation model and an LDA estimation model for adjustment.

FIG. 14 illustrates an example of the method for estimating power consumption of a job by employing the LDA estimation model and the LDA estimation model for adjustment. When detecting a newly submitted job 51, the management server 100 identifies a similar job among jobs having been executed by using a learning result of the LDA estimation model or the LDA estimation model for adjustment depending on the frequency of occurrence of a topic indicated by the job information about the newly submitted job 51. For example, when the frequency of occurrence of a topic of the newly submitted job 51 over all jobs are equal to or more than a given value, the management server 100 uses the learning result of the LDA estimation model for adjustment. Alternatively, when the frequency of occurrence of a topic of the newly submitted job 51 over all jobs are less than a given value, the management server 100 uses the learning result of the LDA estimation model.

The management server 100 identifies a particular job most similar to the newly submitted job 51 and accordingly estimates the power waveform of power consumption of the newly submitted job 51 to be the power waveform of power consumption of the particular job. When determining a similar job by using a learning result of the LDA estimation model for adjustment, after the execution of the newly submitted job 51 is completed, the management server 100 obtains the time series data about power of the newly submitted job 51 and accordingly generates a power waveform. The management server 100 subsequently compares power waveforms of a predetermined number of jobs similar to the newly submitted job 51 with the power waveform of the newly submitted job 51.

The management server 100 then identifies a particular job of the most similar power waveform and updates the weights of topics of the particular job. For example, the management server 100 increases at a predetermined degree the values of weights of topics indicated by the job information about the identified job.

As described above, the management server 100 compares the power waveform of a job that is output after the execution of the job is completed with the power waveforms of a predetermined number of jobs of similar job information and changes the weights of topics in accordance with a topic of job information indicating the most similar power waveform. With this manner, the accuracy of estimation of a similar job by using a learning result of the LDA estimation model for adjustment is improved.

Concerning the LDA estimation model for adjustment, the weights of topics of a job of a power waveform similar to that of the newly submitted job 51 are increased. By repeating such processing, the value of weight of a topic of a higher frequency of occurrence increases and the difference between the topic and other topics of lower frequencies of occurrence widens. As a result, when a particular topic of a relatively low frequency of occurrence is included as a topic of the newly submitted job 51, the effect of the particular topic is not reflected appropriately in similarity determination, resulting in the deterioration of accuracy of similarity determination. In this regard, when the frequency of occurrence of a topic included in a newly submitted job is relatively low, the management server 100 determines a similar job by employing a learning result of the LDA estimation model. This hinders the deterioration of accuracy of estimation regarding a job including a topic of a relatively low frequency of occurrence.

Hereinafter, the procedure of processing for estimating power consumption of a job is described in detail.

Figure 15:
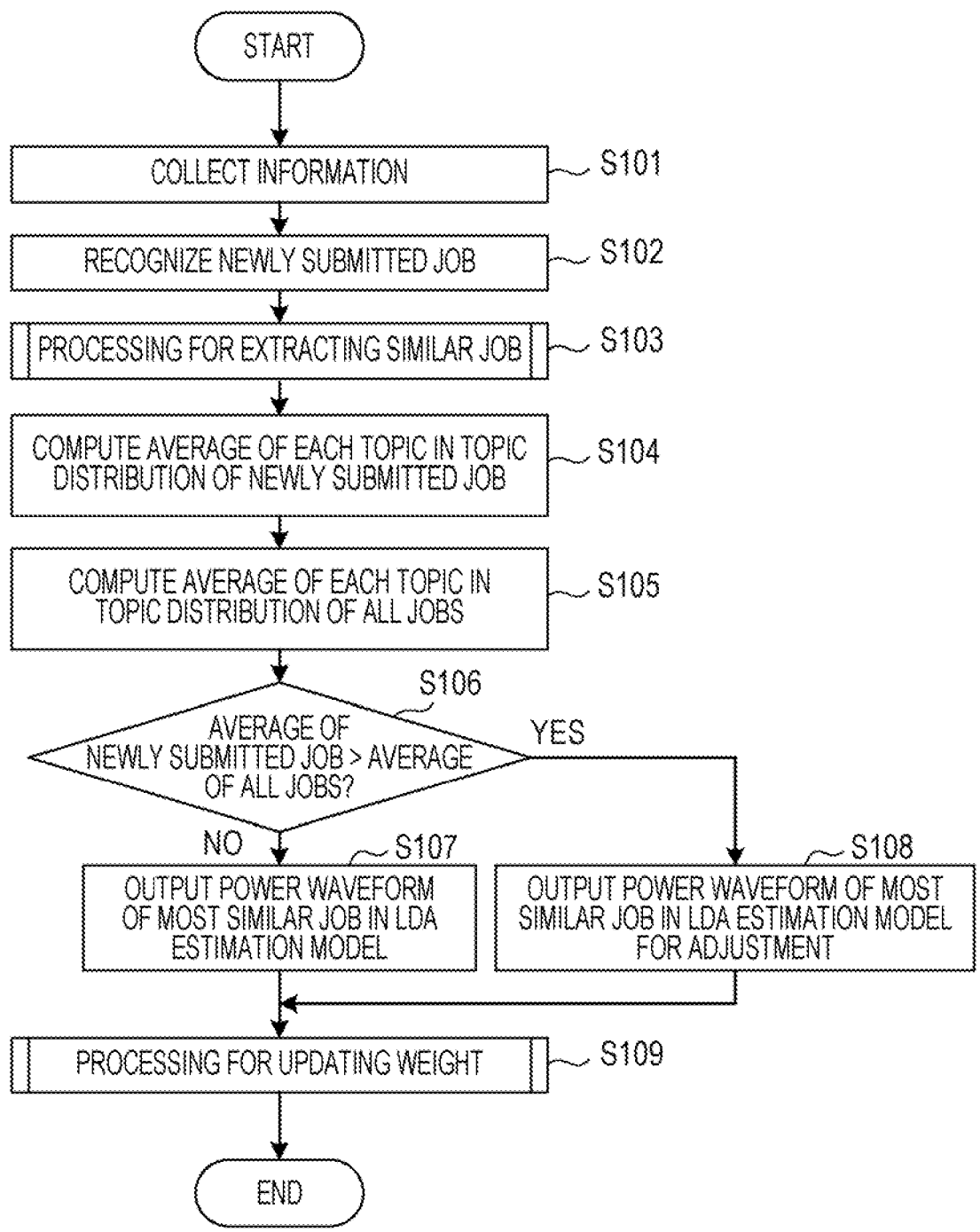
FIG. 15 is a flowchart illustrating an example of a procedure of processing for estimating power consumption.

FIG. 15 is a flowchart illustrating an example of the procedure of processing for estimating power consumption. The processing operations illustrated in FIG. 15 are described in order of the step numbers.

[Step S101] The timer unit 120 measures a time that has elapsed since a previous processing for estimating power consumption was performed, and when a predetermined time has elapsed, the timer unit 120 instructs the metrics collection unit 130 to start collecting information. The metrics collection unit 130 collects information from the HPC operation management server 200. For example, the metrics collection unit 130 obtains, from the DB 210 in the HPC operation management server 200, the job status information about each job and the time series data about power of each job having been executed. For example, the job status information includes information indicating whether the corresponding job is a newly submitted job waiting for execution. The metrics collection unit 130 stores the obtained information in the DB 110.

[Step S102] The LDA learning unit 140 recognizes a newly submitted job among the jobs indicated by the obtained job status information. For example, the LDA learning unit 140 extracts the job ID of the newly submitted job as a target for estimating power consumption.

[Step S103] The LDA learning unit 140 and the LDA estimation value calculation unit 150 cooperate with each other and extract a job (a similar job) of job information similar to the job information about the newly submitted job. Details of processing for extracting a similar job will be described later (refer to FIG. 16).

[Step S104] The LDA estimation value calculation unit 150 computes the average of values obtained by weighting topics indicated in the topic distribution of the newly submitted job. For example, the LDA estimation value calculation unit 150 computes the topic distribution of the newly submitted job in accordance with the LDA estimation model for adjustment. The topic distribution indicates, by using a numerical value, how much the information about a particular topic is included, with respect to each of a plurality of topics included in the job information about the newly submitted job. The computed numerical values reflect weights of respective topics, and thus, as the weight of a particular topic increases, the numerical value increases.

[Step S105] The LDA estimation value calculation unit 150 computes the average of values obtained by weighting topics indicated in the topic distributions of all jobs (the average of all topics of all jobs).

[Step S106] The LDA estimation value calculation unit 150 compares the average value that is computed for the newly submitted job in step S104 and the average value that is computed for all jobs in step S105. When the average value regarding the newly submitted job is greater than the average value regarding all jobs, the LDA estimation value calculation unit 150 causes the process to proceed to step S108. In contrast, when the average value regarding the newly submitted job is equal to or less than the average value regarding all jobs, the LDA estimation value calculation unit 150 causes the process to proceed to step S107.

[Step S107] The LDA estimation value calculation unit 150 identifies a job of a topic distribution most similar to the topic distribution of the newly submitted job in accordance with the LDA estimation model. The LDA estimation value calculation unit 150 then outputs the power waveform of the identified job as the estimation result of the power waveform of the newly submitted job. The estimation result transmission unit 160 sends to the HPC operation management server 200 the estimation result that is output by the LDA estimation value calculation unit 150. The LDA estimation value calculation unit 150 subsequently causes the process to proceed to step S109.

[Step S108] The LDA estimation value calculation unit 150 identifies a job of a topic distribution most similar to the topic distribution of the newly submitted job in accordance with the LDA estimation model for adjustment. The LDA estimation value calculation unit 150 then outputs the power waveform of the identified job as the estimation result of the power waveform of the newly submitted job. The estimation result transmission unit 160 sends to the HPC operation management server 200 the estimation result that is output by the LDA estimation value calculation unit 150.

[Step S109] The LDA weight updating unit 170 performs processing for updating weight. Details of the processing for updating weight will be described later (refer to FIG. 17).

As described above, it is possible to estimate the power consumption of a newly submitted job by employing the LDA estimation model or the LDA estimation model for adjustment and also update weights of topics to be used for the LDA estimation model for adjustment.

Next, the processing for extracting a similar job is described in detail.

Figure 16:
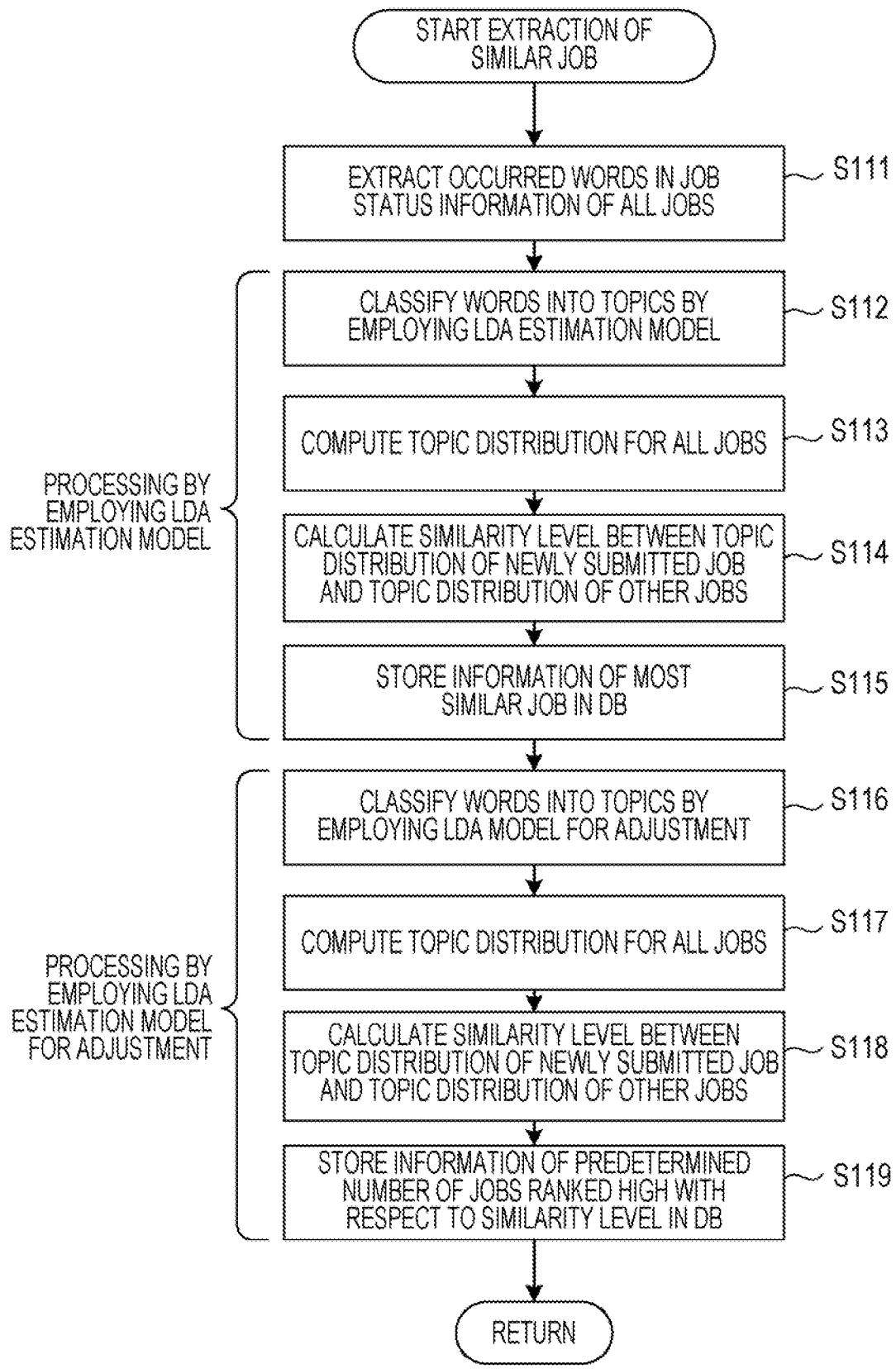
FIG. 16 is a flowchart illustrating an example of a procedure of processing for extracting a similar job.

FIG. 16 is a flowchart illustrating an example of a procedure of the processing for extracting a similar job. The processing operations illustrated in FIG. 16 are described in order of the step numbers.

[Step S111] The LDA learning unit 140 extracts words that occur in the job status information about all jobs.

[Step S112] The LDA learning unit 140 classifies the words into the topic by employing the LDA estimation model. Specifically, by using expression (2) described above, the LDA learning unit 140 groups together words of higher probabilities that the words occur in the same job status information and determines the generated group as a topic. The LDA learning unit 140 stores in the DB 110 generated topics and lists of words belonging to the respective topics as the learning result.

[Step S113] The LDA estimation value calculation unit 150 computes, with respect to each job, a topic distribution included in the job status information about a particular job in accordance with the learning result obtained by employing the LDA estimation model.

[Step S114] The LDA estimation value calculation unit 150 calculates, in accordance with the topic distributions obtained by using the learning result of the LDA estimation model, a similarity level between the topic distribution of the newly submitted job and the topic distribution of each of the other jobs having been executed.

[Step S115] According to the calculation of similarity level in step S114, the LDA estimation value calculation unit 150 stores in the DB 110 information (for example, a job ID) about a job most similar to the newly submitted job.

[Step S116] The LDA learning unit 140 classifies words into topics by employing the LDA estimation model for adjustment. Specifically, when computing the probability that a particular word would be generated in accordance with the topic, the LDA learning unit 140 sets the weight of each topic as the value of $\beta$ in expression (2) described above. The LDA learning unit 140 then groups together words of higher probabilities that the words occur in the same job status information and determines the generated group as a topic. The LDA learning unit 140 stores in the DB 110 generated topics and lists of words belonging to the respective topics as the learning result.

[Step S117] The LDA estimation value calculation unit 150 computes, with respect to each job, a topic distribution included in the job status information about a particular job in accordance with the learning result obtained by employing the LDA estimation model for adjustment.

[Step S118] The LDA estimation value calculation unit 150 calculates, in accordance with the topic distributions obtained by using the learning result of the LDA estimation model for adjustment, a similarity level between the topic distribution of the newly submitted job and the topic distribution of each of the other jobs having been executed.

[Step S119] According to the calculation of similarity level in step S118, the LDA estimation value calculation unit 150 stores in the DB 110 information (for example, a job ID) about a predetermined number (for example, ten) of jobs selected in order starting from the job most similar to the newly submitted job.

As described above, the similarity level between jobs is calculated in accordance with each of the LDA estimation model and the LDA estimation model for adjustment and accordingly jobs ranked high are extracted.

Next, the processing for updating weight is described in detail.

Figure 17:
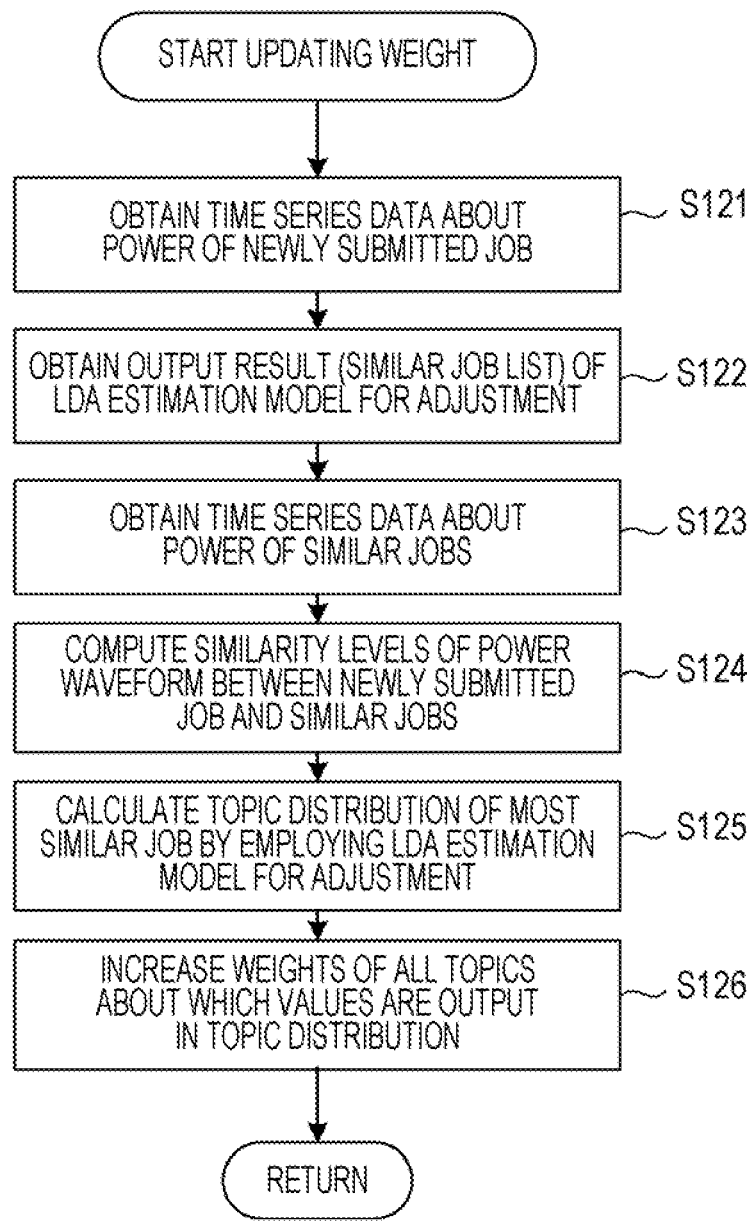
FIG. 17 is a flowchart illustrating an example of a procedure of processing for updating weight.

FIG. 17 is a flowchart illustrating an example of a procedure of the processing for updating weight. The processing operations illustrated in FIG. 17 are described in order of the step numbers.

[Step S121] The LDA weight updating unit 170 obtains from the DB 110 the time series data about power of the newly submitted job.

[Step S122] The LDA weight updating unit 170 obtains from the DB 110 the output result (a similar job list) of similar jobs determined by employing the LDA estimation model for adjustment.

[Step S123] The LDA weight updating unit 170 obtains from the DB 110 the time series data about power of the similar jobs.

[Step S124] The LDA weight updating unit 170 computes a similarity level of power waveform between the newly submitted job and the similar jobs. The similarity level of power waveform is able to be calculated by employing, for example, a dynamic time warping (DTW) method.

When calculating a similarity level of power waveform by employing DTW, the LDA weight updating unit 170 draws two line graphs representing two kinds of power waveforms targeted for comparison, in which the horizontal axis indicates execution time and the vertical axis indicates power. The line graph is created by coupling points (measurement points) indicating power corresponding to individual execution times.

The LDA weight updating unit 170 measures the distance between the values of measurement points plotted in a time series manner on the two power waveforms with respect to all measurement points and discovers a relation (a warping path) in which the value of the distance between measurement points in time series data is smallest. The LDA weight updating unit 170 then determines the distance corresponding to the warping path as the similarity level between power waveforms.

The DTW has an advantage in which it is possible to perform evaluation between jobs of different execution times. If the similarity level is computed by employing, for example, a correlation coefficient, the similarity level between jobs of significantly different execution times is not accurately evaluated. By contrast, employing the DTW enables the accurate evaluation of similarity level when the execution times of jobs are significantly different from each other.

[Step S125] The LDA weight updating unit 170 calculates a topic distribution of a job of a power waveform most similar to the power waveform of the newly submitted job by employing the LDA estimation model for adjustment.

[Step S126] The LDA weight updating unit 170 increases the weights of all topics indicated in the computed topic distribution. For example, the LDA weight updating unit 170 adds "0.01" to the value of weight of the topic.

As described above, by increasing the value of weight of each topic included in the topic distribution of a job of a similar power waveform, as the number of such topics included in a particular job increases, the value of the similarity level of topic distribution regarding the particular job increases when the similarity level is determined; in other words, the similarity level of topic distribution with respect to jobs of power waveforms similar to the power waveform of the newly submitted job is higher in the case of employing the LDA estimation model for adjustment to calculate the similarity level of topic distribution in comparison to the case of the LDA estimation model. As a result, it is possible to accurately identify a job of a power waveform similar to the power waveform of a newly submitted job.

Since it is possible to accurately estimate the power of a newly submitted job, the HPC operation management server 200 is able to perform job scheduling to level off the power consumption of, for example, the entire HPC system 30. Leveling off the power consumption results in reducing the maximum instantaneous power consumption of the HPC system 30. This enables, for example, downsizing the power supply equipment prepared for operating the HPC system 30.

Furthermore, since it is possible to estimate the power consumption of each job, when the contract regarding the charge for electric power is based on the on-demand pricing system, the control for the power consumption of the HPC system 30 may be appropriately accomplished not to exceed the power under the contract.

Figure 18:
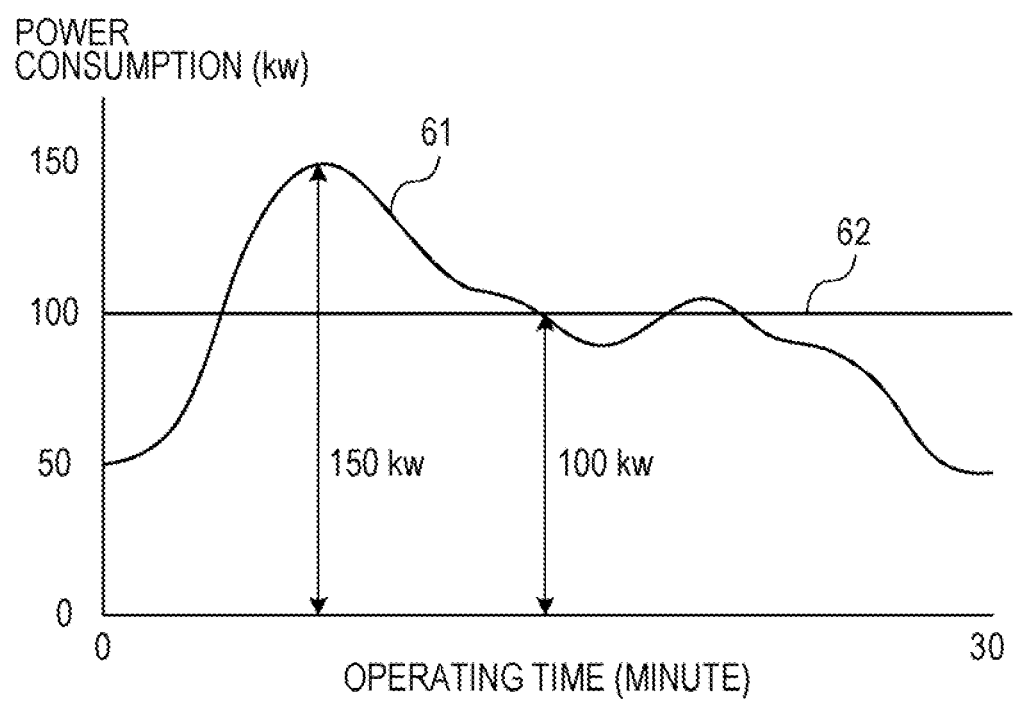
FIG. 18 is a graph for explaining an on-demand pricing system.

FIG. 18 is a graph for explaining the on-demand pricing system. FIG. 18 illustrates a graph of a power waveform 61 representing the power consumption of the entire HPC system 30. In the graph, the horizontal axis indicates operating time of the HPC system 30 and the vertical axis indicates power consumption. An average value 62 during a given period (for example, 30 minutes) in the time series fluctuations of power consumption represented by the power waveform 61 is the amount of power consumption during the period. In the example in FIG. 18, while the maximum instantaneous power consumption is 150 kw, the amount of power consumption is calculated as 100 kw.

In the on-demand pricing system, the charge for electric power per month is computed in accordance with the following calculation expression: "the charge for electric power=the contract charge for electric power+the rate of the charge for electric power x the amount of power consumption per month". Since the HPC system 30 consumes a large amount of electric power, the contract charge for electric power is very expensive. The contract charge for electric power is determined in accordance with the amount of power consumption (the maximum power demand) for 30 minutes when electric power has been consumed at the maximum level in the previous year (for the past one year). Thus, if power consumption exceeds the contract electric power in only one period of 30-minute time unit, the charge for electric power for the subsequent year is increased.

By accurately estimating the power consumption of a newly submitted job, the HPC operation management server 200 is able to appropriately determine whether the amount of power consumption in the following 30-minute period exceeds the maximum power demand in the past one year. When determining that power consumption is about to exceed the maximum power demand in the past one year, the HPC operation management server 200 is able to hinder the amount of power consumption from exceeding the maximum power demand in the past one year by delaying the start of executing a newly submitted job. Consequently, the charge for electric power is suppressed.

Third Embodiment

Next, a third embodiment is described. In the third embodiment, when the similarity level of topic distribution between a particular job and a newly submitted job is equal to or greater than a given value, the particular job is targeted for comparison of power waveform in the processing for updating weight. The third embodiment differs from the second embodiment in details of the processing for extracting a similar job.

Figure 19:
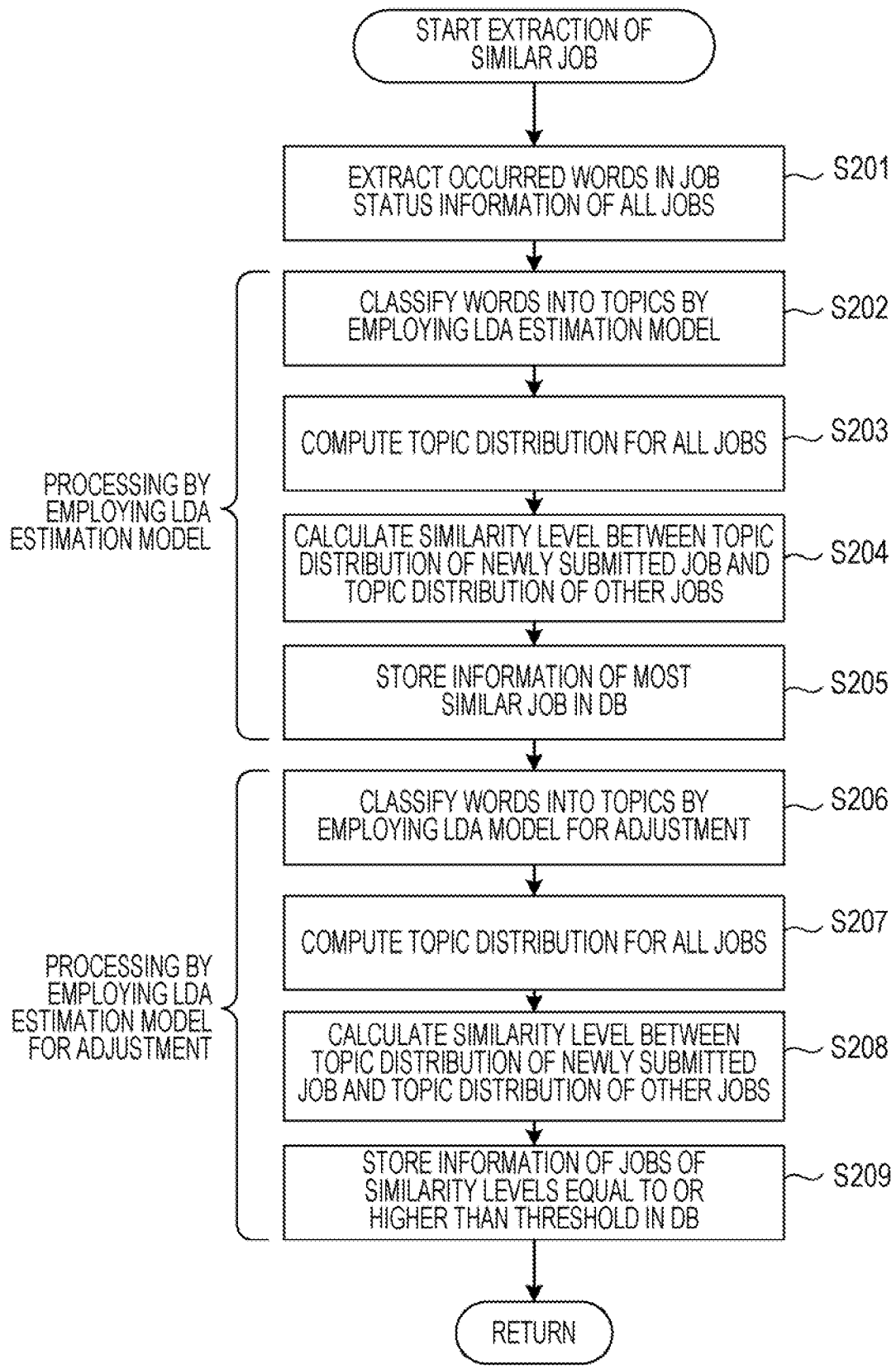
FIG. 19 is a flowchart illustrating an example of a procedure of processing for extracting a similar job in accordance with a third embodiment.

FIG. 19 is a flowchart illustrating an example of a procedure of the processing for extracting a similar job in accordance with the third embodiment. In the process illustrated in FIG. 19, steps S201 to S208 are identical to steps S111 to S118 of the processing for extracting a similar job according to the second embodiment illustrated in FIG. 16. The processing in step S209, which is different from the second embodiment, is as follows.

[Step S209] According to the calculation of similarity level in step S208, the LDA estimation value calculation unit 150 stores in the DB 110 information (for example, a job ID) about jobs of similarity levels with respect to the newly submitted job equal to or greater than a threshold.

In this manner, the job IDs of jobs of similarity levels of topic distribution with respect to the newly submitted job equal to or greater than a threshold are stored in the DB 110. In the processing for updating weight, the job IDs stored in the DB 110 in step S209 are extracted as similar jobs and a similarity level of power waveform between each similar job and the newly submitted job is calculated.

Since jobs of similarity levels of topic distribution equal to or greater than a threshold are used as similar jobs, when many similar jobs exist, it is possible to hinder jobs of power waveform similar to that of a newly submitted job from being excluded from similar jobs.

OTHER EMBODIMENTS

While in the second embodiment the similarity level of job information is calculated by employing the topic model, the management server 100 may calculate the similarity level by employing another method. For example, the management server 100 may use a similarity level (for example, cosine similarity) between vectors each representing the frequency of occurrence of words in the job information about each job as the similarity level of job information between jobs.

Moreover, while in the second embodiment the value of weight is set as β in expression (2), the management server 100 may cause the weight of each topic to be reflected in the topic distribution by employing another method. For example, the management server 100 may perform weighting by multiplying the value representing the frequency of occurrence of each topic in the corresponding topic distribution by the value of weight.

Further, while in the second embodiment the function of the management server 100 and the function of the HPC operation management server 200 are separated from each other, the HPC operation management server 200 may, for example, include the function of the management server 100.

The embodiments have been described above, but the configurations of respective parts described in the embodiments may be replaced with other ones having the same functions. Furthermore, any other structures and processes may be added to the embodiments. In addition, any two or more configurations (features) of the embodiments described above may be combined with each other.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process comprising:
   calculating, based on words within a plurality of documents respectively corresponding to a plurality of jobs, an attribute of a first job that is newly submitted and an attribute of each of a plurality of second jobs that have been executed, a first similarity level indicating a level of similarity of the words within a first document corresponding to the first job and each of a plurality of second documents respectively corresponding to the plurality of second jobs by using a first calculation expression;
   identifying, based on the first similarity level calculated for each of the plurality of second jobs, one of the plurality of second jobs whose corresponding second document is most similar to the first document as a first candidate job;
   estimating, based on second power waveforms respectively indicating power consumed by executing the plurality of second jobs with a high-performance computing system, first power consumption to be consumed by executing the first job at power consumption indicated by a second power waveform of the first candidate job;
   obtaining, after the first job is executed, a first job power waveform indicating power consumption that has been consumed by executing the first job;
   calculating, based on the first job power waveform and the second power waveform, for at least one of the plurality of second jobs, a second similarity level indicating a level of similarity of power consumption between the first job and the at least one of the plurality of second jobs;
   identifying, based on the second similarity level calculated for the at least one of the plurality of second jobs, one of the at least one of the plurality of second jobs whose second power waveform is most similar to the first job power waveform as a second candidate job; and
   adjusting the first calculation expression to increase the first similarity level to be calculated between the first job and the second candidate job, wherein:
   the calculating the first similarity level includes calculating the first similarity level by using weights of individual topics determined based on the words within the plurality of documents, the first calculation expression using the weights to cause a similarity level between two documents including a particular topic to increase as a value of weight of the particular topic increases;
   the adjusting the first calculation expression includes increasing the value of weight of a topic included in the document of the second candidate job; and
   controlling power consumption of the high-performance computing system based on the adjusted first calculation expression.

2. The non-transitory, computer-readable recording medium of claim 1, wherein
   the calculating the first similarity level includes:
   calculating a topic distribution indicating rates of occurrence of topics included in the first job and each of the plurality of second jobs, and
   determining a similarity level of topic distribution between the first job and each of the plurality of second jobs as the first similarity level between the first job and each of the plurality of second jobs.

3. The non-transitory, computer-readable recording medium of claim 1, wherein
   the calculating the first similarity level includes:
   determining, in accordance with the weight of a topic included in the first job, whether to calculate the first similarity level by employing the first calculation expression using the weight of the topic or by employing a second calculation expression not using the weight of the topic, and
   calculating the first similarity level by employing the first calculation expression or the second calculation expression depending on a result of the determining.

4. The non-transitory, computer-readable recording medium of claim 1, wherein
   the calculating the second similarity level is performed for a predetermined number of second jobs which are selected, from among the plurality of second jobs, in order starting from a second job whose first similarity level is highest among the plurality of second jobs.

5. The non-transitory, computer-readable recording medium of claim 1, wherein
the calculating the second similarity level is performed for each of second jobs, among the plurality of second jobs, whose first similarity level is equal to or greater than a threshold.

6. The non-transitory, computer-readable recording medium of claim 1, wherein the first similarity level is calculated based on a latent dirichlet allocation (LDA) estimation model.

7. The non-transitory, computer-readable recording medium of claim 1, wherein the first similarity level and the second similarity level are calculated based on different attributes.

8. The non-transitory, computer-readable recording medium of claim 1, wherein the first similarity value is calculated with at least one of a cosine similarity and vector space method.

9. The non-transitory, computer-readable recording medium according to claim 1, wherein the controlling power consumption controls the power consumption of the high-performance computing system to be below a maximum power demand.

10. The non-transitory, computer-readable recording medium of claim 1, wherein the first calculation expression includes a the probability with respect to the plurality of documents and words within the plurality of documents $$P(z_{d,n} = k \mid w_{d,n} = v, w^{\backslash d,n}, z^{\backslash d,n}, \alpha, \beta) \propto \frac{N_{k,v}^{\backslash d,n} + \beta}{N_k^{\backslash d,n} + \beta V} (N_{d,k}^{\backslash d,n} + \alpha) \quad (2)$$

P is the probability, N is the total number of words in a collection of documents, V is the total number of kinds of word, d is an index of a particular document, n is an index of a particular word, v is an index of a particular kind of word, w is a particular word, z is a particular topic, A backslash indicates the difference with respect to a collection, $\beta$ is a parameter of word distribution, and expression (2) is a sampling expression expressing a topic $z_{d,n}$ of a word $w_{d,n}$ in a document d.

11. A method performed by a computer, the method comprising:
calculating, based on words within a plurality of documents respectively corresponding to a plurality of jobs, an attribute of a first job that is newly submitted and an attribute of each of a plurality of second jobs that have been executed, a first similarity level indicating a level of similarity of the words within a first document corresponding to the first job and each of a plurality of second documents respectively corresponding to the plurality of second jobs by using a first calculation expression;
identifying, based on the first similarity level calculated for each of the plurality of second jobs, one of the plurality of second jobs whose corresponding second document is most similar to the first document as a first candidate job;
estimating, based on second power waveforms respectively indicating power consumed by executing the plurality of second jobs with a high-performance computing system, first power consumption to be consumed by executing the first job at power consumption indicated by a second power waveform of the first candidate job;
obtaining, after the first job is executed, a first job power waveform indicating power consumption that has been consumed by executing the first job;
calculating, based on the first job power waveform and the second power waveform, for at least one of the plurality of second jobs, a second similarity level indicating a level of similarity of power consumption between the first job and the at least one of the plurality of second jobs;
identifying, based on the second similarity level calculated for the at least one of the plurality of second jobs, one of the at least one of the plurality of second jobs whose second power waveform is most similar to the first job power waveform as a second candidate job; and
adjusting the first calculation expression to increase the first similarity level to be calculated between the first job and the second candidate job, wherein:
the calculating the first similarity level includes calculating the first similarity level by using weights of individual topics determined based on the words within the plurality of documents, the first calculation expression using the weights to cause a similarity level between two documents including a particular topic to increase as a value of weight of the particular topic increases;
the adjusting the first calculation expression includes increasing the value of weight of a topic included in the document of the second candidate job; and
controlling power consumption of the high-performance computing system based on the adjusted first calculation expression.

12. An apparatus comprising:
a memory; and
a processor coupled to the memory and configured to:
calculate, based on words within a plurality of documents respectively corresponding to a plurality of jobs, an attribute of a first job that is newly submitted and an attribute of each of a plurality of second jobs that have been executed, a first similarity level indicating a level of similarity of the words within a first document corresponding to the first job and each of a plurality of second documents respectively corresponding to the plurality of second jobs by using a first calculation expression;
identify, based on the first similarity level calculated for each of the plurality of second jobs, one of the plurality of second jobs whose corresponding second document is most similar to the first document as a first candidate job;
estimate, based on second power waveforms respectively indicating power consumed by executing the plurality of second jobs with a high-performance computing system, first power consumption to be consumed by executing the first job at power consumption indicated by a second power waveform of the first candidate job;
obtain, after the first job is executed, a first job power waveform indicating power consumption that has been consumed by executing the first job;
calculate, based on the first job power waveform and the second power waveform, for at least one of the plurality of second jobs, a second similarity level indicating a level of similarity of power consumption between the first job and the at least one of the plurality of second jobs;

identify, based on the second similarity level calculated for the at least one of the plurality of second jobs, one of the at least one of the plurality of second jobs whose second power waveform is most similar to the first job power waveform as a second candidate job; and adjust the first calculation expression to increase the first similarity level to be calculated between the first job and the second candidate job, wherein:

the processor further calculates the first similarity level includes calculating the first similarity level by using weights of individual topics determined based on the words within the plurality of documents, the first calculation expression using the weights to cause a similarity level between two documents of the including a particular topic to increase as a value of weight of the particular topic increases;

adjusts the first calculation expression includes increasing the value of weight of a topic included in the document of the second candidate job; and controls power consumption of the high-performance computing system based on the adjusted first calculation expression.

13. The apparatus of claim 12, wherein the processor is further configured to:

calculate a topic distribution indicating rates of occurrence of topics included in the first job and each of the plurality of second jobs, and determine a similarity level of topic distribution between the first job and each of the plurality of second jobs as the first similarity level between the first job and each of the plurality of second jobs.

14. The apparatus of claim 12, wherein the processor calculates the first similarity level by determining, in accordance with the weight of a topic included in the first job, whether to calculate the first similarity level by employing the first calculation expression using the weight of the topic or by employing a second calculation expression not using the weight of the topic, and employing the first calculation expression or the second calculation expression depending on a result of the determining.

15. The apparatus of claim 12, wherein the processor calculates the second similarity level for a predetermined number of second jobs which are selected, from among the plurality of second jobs, in order starting from a second job whose first similarity level is highest among the plurality of second jobs.

16. The apparatus of claim 12, wherein the first similarity level is calculated based on a latent dirichlet allocation (LDA) estimation model.

17. The apparatus of claim 12, wherein the first similarity level and the second similarity level are calculated based on different attributes.

* * * * *